(12) United States Patent
Tan et al.

(10) Patent No.: US 8,217,615 B2
(45) Date of Patent: Jul. 10, 2012

(54) CURRENT SENSING IN A DISK-DRIVE SPINDLE MOTOR

(75) Inventors: Wenxiao Tan, Murphy, TX (US); Gregory Swize, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 537 days.

(21) Appl. No.: 12/435,823

(22) Filed: May 5, 2009

(65) Prior Publication Data

US 2010/0283422 A1 Nov. 11, 2010

(51) Int. Cl.
*G05F 1/10* (2006.01)
(52) U.S. Cl. ............... 318/650; 318/400.01; 318/400.26; 318/400.27; 318/801
(58) Field of Classification Search ............. 318/400.01, 318/400.3, 400.27, 400.36, 490, 801, 650, 318/400.26, 400.29
See application file for complete search history.

(56) References Cited

U.S. PATENT DOCUMENTS

| | | | | |
|---|---|---|---|---|
| 5,866,998 A | * | 2/1999 | Menegoli | 318/400.27 |
| 5,867,001 A | * | 2/1999 | Lagerquist et al. | 318/400.32 |
| 5,959,417 A | * | 9/1999 | Maggio et al. | 318/400.04 |
| 6,252,362 B1 | * | 6/2001 | White et al. | 318/400.35 |
| 6,735,537 B2 | * | 5/2004 | Liu et al. | 702/64 |
| 6,906,485 B2 | * | 6/2005 | Hussein | 318/400.28 |
| 6,934,135 B1 | * | 8/2005 | Ryan | 361/23 |
| 6,967,458 B1 | * | 11/2005 | Bennett et al. | 318/400.04 |
| 7,119,508 B2 | * | 10/2006 | Kurosawa et al. | 318/400.04 |
| 7,863,841 B2 | * | 1/2011 | Menegoli et al. | 318/400.29 |
| 7,929,344 B2 | * | 4/2011 | Maejima | 365/185.03 |

* cited by examiner

*Primary Examiner* — Walter Benson
*Assistant Examiner* — Antony M Paul
(74) *Attorney, Agent, or Firm* — John J. Patti; Wade J. Brady, III; Frederick J. Telecky, Jr.

(57) ABSTRACT

One embodiment of the invention includes a disk-drive spindle motor power regulator system. The system includes a switching system comprising at least one power transistor for each of a plurality of phases of a disk-drive spindle motor. The system also includes a switching controller configured to generate a plurality of switching signals configured to control the at least one power transistor for each of the plurality of phases of the disk-drive spindle motor. The system further includes a current monitor configured to measure a magnitude of an individual phase current through at least one of the plurality of phases of the disk-drive spindle motor.

25 Claims, 7 Drawing Sheets

CURRENT SENSING IN A DISK-DRIVE SPINDLE MOTOR

TECHNICAL FIELD

This invention relates to electronic circuits, and more specifically to current sensing in a disk-drive spindle motor.

BACKGROUND

There is an ever increasing demand for power conversion and regulation circuitry to operate with increased efficiency and reduced power to accommodate the continuous reduction in size of electronic devices. Switching regulators have been implemented as an efficient mechanism for providing a regulated output in power supplies. One such of regulator is known as a switching regulator or switching power supply, which controls the flow of power to a load by controlling the on and off duty-cycle of one or more switches coupled to the load. Many different classes of switching regulators exist today.

Switching regulators can be implemented in any of a variety of applications. One such application is in a control system for disk-drive spindle motors. It is sometimes desirable to be able to monitor a magnitude of current that flows through the switches of a switching regulator for a disk-drive spindle motor, such as to control a rotational speed of the disk-drive spindle motor. Some spindle motor power regulator integrated circuits (ICs) may incorporate additional input/output (I/O) pins to accommodate an external sense resistor and/or associated sensing circuitry. Such methods thus can be subject to additional cost and/or space to incorporate the additional I/O pins and the associated circuitry. In addition, typical current sensing schemes for spindle motor power regulators may incorporate a sense resistor that interconnects all of the low-side power transistors with ground or a common low voltage rail, such that the current that is sensed is an aggregate current of each of the phases of the spindle motor.

SUMMARY

One embodiment of the invention includes a disk-drive spindle motor power regulator system. The system includes a switching system comprising at least one power transistor for each of a plurality of phases of a disk-drive spindle motor. The system also includes a switching controller configured to generate a plurality of switching signals configured to control the at least one power transistor for each of the plurality of phases of the disk-drive spindle motor. The system further includes a current monitor configured to measure a magnitude of an individual phase current through at least one of the plurality of phases of the disk-drive spindle motor.

Another embodiment of the invention includes a method for measuring an individual phase current through at least one of a plurality of phases of a disk-drive spindle motor. The method includes generating a plurality of switching signals that control at least one power transistor for each of the plurality of phases of the disk-drive spindle motor and identifying which of at least one of the plurality of phases through which the respective individual phase current is to be measured based on the plurality of switching signals. The method also includes switching a plurality of reference currents corresponding to the respective individual phase current to a respective current sense system and measuring the magnitude of the respective individual phase current of the at least one of the plurality of phases based on the plurality of reference currents. The method further includes calculating a magnitude of one or more remaining phase currents based on the magnitude of the respective individual phase current.

Another embodiment of the invention includes a disk-drive spindle motor power regulator system. The system includes means for generating a plurality of switching signals associated with each of a first phase, a second phase, and a third phase, respectively, of the disk-drive spindle motor. The system also includes means for generating a first phase current, a second phase current, and a third phase current through the first, second, and third phases respectively, of the disk-drive spindle motor in response to the plurality of switching signals. The system further includes means for measuring a magnitude of two of the first, second, and third phase currents and means for calculating a' magnitude of a remaining one of the first, second, and third phase currents based on the measured magnitude of the two of the first, second, and third phase currents.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
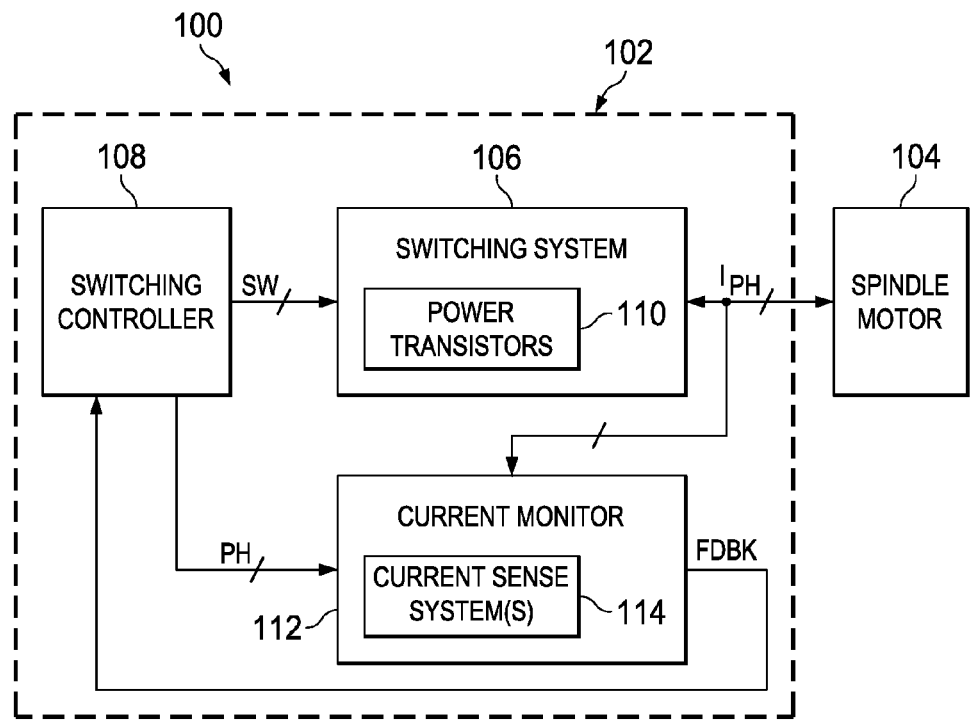
FIGS. 1 and 2 illustrates an example of a spindle motor power regulator system in accordance with an aspect of the invention.

The invention relates to electronic circuits, and more specifically to current sensing in a disk-drive spindle motor. As an example, the disk-drive spindle motor can be a permanent magnet three-phase synchronous DC motor with a center tap of windings that is floating or otherwise unconnected from a low-voltage power rail (e.g., ground). A disk-drive spindle motor power regulator system includes a switching controller that provides switching signals to a switching system. The switching system can include a set of one or more power transistors for each phase of the disk-drive spindle motor. Therefore, the switching controller can define a commutation state or cycle for the spindle motor through each set of switching signals to each of the respective sets of one or more power transistors to control the rotation of the spindle motor.

As an example, during each commutation cycle, two sets of switching signals corresponding to two of the phases of the spindle motor are pulse-width modulated (PWM) at a fixed PWM frequency. A PWM duty-cycle can be different for the sets switching signals, with one set of the switching signals having a greater duty-cycle than the other. The PWM duty-cycle can change for each of the two sets of the switching signals from one PWM period to another, but the relationship between the duty-cycles between the two sets of the switching signals can remain the same during the commutation cycle. Specifically, one of the sets of switching signals can have a PWM duty-cycle that is always greater than the other during the commutation cycle, and thus has a greatest duty-cycle in each PWM period of the commutation cycle. The third set of switching signals is provided to pull down the respective phase of the spindle motor to the ground during the commutation cycle, such that the third set of switching signals does not have a PWM duty-cycle. The sets of the switching signals thus control three separate phases of the spindle motor during each commutation cycle.

As described herein, the three phases of the spindle motor are the CAP phase, the SLOPE phase, and the GROUND phase. The respective phases of the spindle motor thus conduct a CAP phase current, a SLOPE phase current, and a GROUND phase current, respectively. The CAP phase and the SLOPE phase are each controlled by sets of the switching signals having a PWM duty-cycle. The PWM duty-cycle of the switching signals that control the CAP phase is greater than the set of switching signals that control the SLOPE phase. Thus, the CAP phase current is substantially constantly sourced to the spindle motor during the commutation cycle. The SLOPE phase current, however, changes direction during the commutation cycle. Thus, the SLOPE phase current is not constantly sourced to the spindle motor during the commutation cycle, but instead is sunk from the spindle motor during at least a portion of the commutation cycle. The switching signals that control the GROUND phase do not have a PWM duty-cycle. Thus, the GROUND phase current is substantially constantly sunk from the spindle motor during the commutation phase. The phases change from one commutation cycle to the next, such as to control the speed and torque of the spindle motor. Thus, the rotation and speed control of the spindle motor can be achieved by combining the proper different commutation states in sequence.

The power regulator system can also include a current monitor that is configured to measure a magnitude of an individual current flow through one or more of the phases of the spindle motor during each PWM cycle. The switching controller can identify which of the switching signals correspond to control of the associated phases of the spindle motor. Thus, the current monitor can measure the magnitude of the CAP phase current that is substantially constantly sourced to a first phase of the spindle motor during the commutation cycle. The current monitor can also measure the magnitude of the GROUND phase current that is substantially constantly sunk from a second phase of the spindle motor to the low-voltage power rail during the commutation cycle. The SLOPE phase current can be either a sourcing current or a sinking current, and the corresponding set of switching signals can have a duty-cycle that is very small. Therefore, the current monitor may not measure the SLOPE phase current.

The current monitor can include a current sense system for each of the phase currents that are to be measured (i.e., a high-side current sense system and a low-side current sense system). The current sense systems can each include one or more current sensing transistors, such as laterally-diffused metal-oxide semiconductor field-effect transistors (LDMOS-FETs), that are configured to conduct a respective one or more reference currents in response to a control signal that controls the power transistor. The reference currents can be provided to an operational amplifier that is configured to generate a sense current that is substantially proportional to (i.e., highly linear with respect to) the output current. As an example, the current sense system can include sets of phase switches that direct the reference currents corresponding to the respective phase to the operational amplifier for measurement, and the operational amplifier can include a current control circuit that is configured to generate a sense voltage that is proportional to a magnitude of the respective phase current.

The current monitor can also include an analog-to-digital converter (ADC) that is configured to convert the sense voltage corresponding to each of the respective measured phase currents to a digital value. The digital sense voltages can thus be provided to a processor which can calculate a delivered power to the disk-drive spindle motor, and thus the speed of the disk-drive spindle motor. As an example, the current monitor can calculate a magnitude of the SLOPE phase current of the spindle motor based on the calculated magnitudes of the CAP and GROUND phase currents. The phase current magnitude information can thus be implemented by the processor to control and/or adjust the rotational speed and torque of the spindle motor, such as to control the spindle motor to rotate silently at a substantially constant speed.

FIG. 1 illustrates an example of a system 100 having a spindle motor power regulator system 102 in accordance with an aspect of the invention. The spindle motor power regulator system 102 can be implemented to control the rotational motion of a spindle motor 104. As an example, the spindle motor 104 can be a three-phase synchronous direct current or DC motor with a center tap of windings that is floating or otherwise unconnected from a low-voltage power rail (e.g., ground). The spindle motor 104 can be implemented in any of a variety of disk-drive systems. For example, the spindle motor 104 can be implemented in a magnetic disk-drive system such as a hard-disk-drive (HDD) or a peripheral disk-drive, or can be implemented in an optical disk-drive system, such as a compact disc (CD) drive, or a digital video disc (DVD) drive. In addition, the spindle motor power regulator system 102 can be implemented on or as a portion of an integrated circuit (IC).

The spindle motor power regulator system 102 includes a switching controller 108 that is configured to generate a plurality of switching signals SW. The switching signals SW are provided to a switching system or inverter 106 that is configured to control the flow of a set of phase currents through the respective phases of the spindle motor 104. In the example of FIG. 1, the set of phase currents are demonstrated as a current $I_{PH}$. The switching system 106 includes power transistors 110 that are responsive to the switching signals SW.

As an example, the switching signals SW can include a high-side switching signal and a low-side switching signal for each phase of the spindle motor 104. For example, the switching controller 108 can include a set of drivers for each of the phases of the spindle motor that generate the respective sets of the switching signals SW in response to one or more logic signals, such as to substantially mitigate a shoot-through current through the power transistors 18. As an example, the power transistors 110 can be LDMOSFETs (hereinafter "FETs"), and can include a high-side transistor and a low-side transistor for each of the respective phases of the spindle motor 104. The high-side and low-side switching signals of the plurality of switching signals SW can each include one or more digital and/or analog signals corresponding to activation and/or status of the power transistors 18. Therefore, in the example of FIG. 1, a portion of the switching signals SW can be pulse-width modulated (PWM) digital signals that can each be separately asserted and de-asserted by the switching controller 108 in a given commutation cycle. For example, two of the sets of the switching signals SW can have a defined duty-cycle corresponding to control of a CAP phase and a SLOPE phase, respectively, of the spindle motor 104 and a third set of the switching signals can have no PWM duty-cycle, thus controlling a GROUND phase of the spindle motor 104. Accordingly, the power transistors 110 of the switching system 106 are activated and deactivated based on a predetermined PWM scheme to rotate the spindle motor

104 based on commutation in response to the magnetic field energy generated by the inductive load of the phases.

The spindle motor power regulator system 102 also includes a current monitor 112 that is configured to measure the magnitude of at least one of the individual phase currents $I_{PH}$ that flow through the spindle motor 104 during each PWM cycle. As an example, the current monitor 112 can be configured to measure a magnitude of the CAP phase current and the GROUND phase current. Specifically, the current monitor 112 can be configured to measure a magnitude of the phase current that results from a PWM duty-cycle and is substantially constantly sourced to the respective one of the phases of the spindle motor 104 during the commutation cycle. The current monitor 112 can also be configured to measure a magnitude of the phase current that results from no PWM duty-cycle and thus has a substantially constant flow through the respective one of the phases to a low-voltage power rail (e.g., ground).

In the example of FIG. 1, the switching controller 108 is configured to generate phase control signals PH that are indicative of which of the phase currents flowing through the spindle motor 104 are to be measured. As an example, in a commutation cycle, the switching controller 108 generates two sets of the switching signals SW as having a PWM duty-cycle for controlling the CAP phase current and the SLOPE phase current via the switching system 106. The set of the switching signals SW controlling the CAP phase can have a significantly greater PWM duty-cycle in each PWM period of the commutation cycle than the switching signals controlling the SLOPE phase. The switching controller 108 also generates a set of the switching signals SW that is a non-PWM signal for controlling the GROUND phase current via the switching system 106. Therefore, phase control signals PH are provided to the current monitor 112 to identify which of the sets of phase currents $I_{PH}$ corresponds to the CAP phase current and which of the sets of phase currents IPH corresponds to the GROUND phase current based on the manner in which the switching signals SW are provided to the switching system 106.

The current monitor 112 includes one or more current sense systems 114 that are configured to measure the respective phase currents. As an example, the current sense system(s) 114 can switch reference currents corresponding to the CAP and GROUND phases, as identified by the phase control signals PH, to an operational amplifier for measurement of the magnitude of the respective phase currents. In addition, the current monitor 112 can calculate the magnitude of the remaining phase current (i.e., the SLOPE phase current) of the spindle motor 104 to ascertain commutation speed and torque information associated with the spindle motor 104. The current monitor 112 can thus generate a feedback control signal FDBK that corresponds to commutation speed control of the spindle motor 104. In the example of FIG. 1, the feedback control signal FDBK is thus provided to the switching controller 108, such that the pulse-width modulation of the switching signals SW can be adjusted to appropriately control the commutation speed and torque of the spindle motor 104, such that the spindle motor can spin silently at a substantially constant speed.

Figure 2:
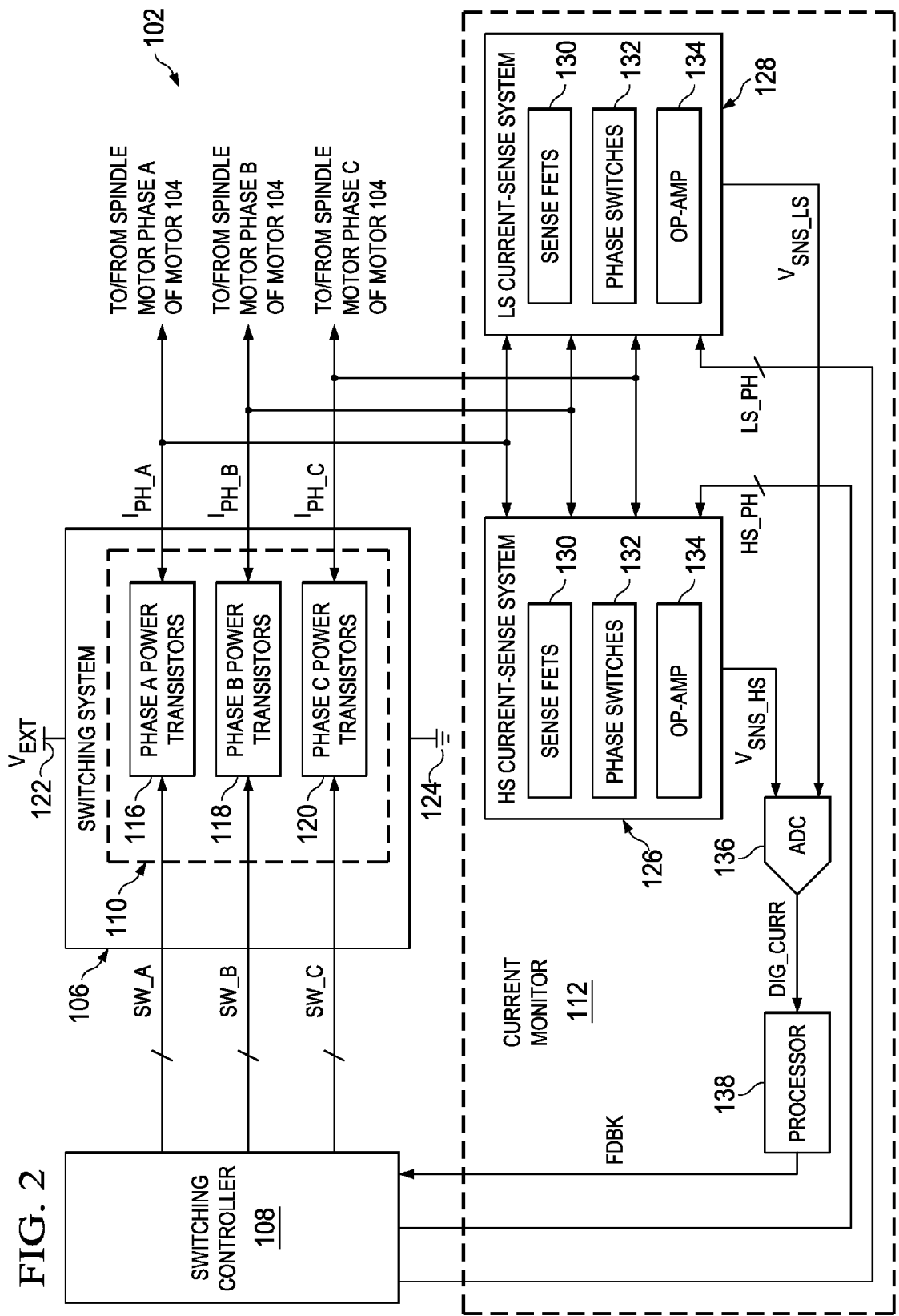

Turning to FIG. 2, a more detailed example of the spindle motor power regulator system 102 in accordance with an aspect of the invention. For this example, spindle motor 104 is a three-phase synchronous DC spindle motor, and the spindle motor power regulator system 102 can be implemented to control the rotational motion of this spindle motor 104. In the description herein, the three phases of the spindle motor 104 are described as "A", "B", and "C". In addition, as described herein, "X" corresponds to a respective one of the phases A, B, or C of the spindle motor, such as can be applicable to any one or a respective one of the phases A, B, or C. Similar to as described above in the example of FIG. 1, the spindle motor can be implemented in an HDD or a peripheral disk-drive. Again, the spindle motor power regulator system 102 can be implemented on or as a portion of an IC.

As shown in this example, the switching controller 108 is configured to generate a set of switching signals for each of the three-phases of the spindle motor. The switching signals are demonstrated as SW_A corresponding to control of the first phase of the spindle motor 104, SW_B corresponding to control of the second phase of the spindle motor 104, and SW_C corresponding to control of the third phase of the spindle motor 104. The switching signals SW_A, SW_B, and SW_C are provided to the inverter 106. In the example of FIG. 2, the switching system 106 the power transistors 110 include first phase (i.e., "PHASE A") power transistors 116, second phase (i.e., "PHASE B") power transistors 118, and phase power transistors 120 (i.e., "PHASE C"). The phase power transistors 116, 118, and 120 are configured to control the flow of a phase current $I_{PH\_A}$, a phase current $I_{PH\_B}$, and a phase current $I_{PH\_C}$ through the respective phases of the spindle motor.

As an example, each set of the switching signals SW_A, SW_B, and SW_C can include a high-side switching signal that controls a high-side transistor and a low-side switching signal that controls a low-side transistor of the respective phase power transistors 116, 118, and 120. The high-side and low-side switching signal of each set of the switching signals SW_A, SW_B, and SW_C can include one or more digital and/or analog signals corresponding to activation and/or status of the power transistors 116, 118, and 120. As another example, the switching signals SW_A, SW_B, and SW_C can each include signals that mutually exclusively activate/deactivate the high-side and low-side transistors of each of the respective phase power transistors 116, 118, and 120, such as to substantially mitigate a shoot-through current through the respective high-side and low-side transistors of each phase of the spindle motor. As an example, phase power transistors 116, 118, and 120 can be configured as FETs that are coupled to output nodes or terminals of the system 102. The respective high-side and low-side transistors can thus couple the respective phases of the spindle motor to one of a high-voltage power rail 122, demonstrated as having a voltage $V_{EXT}$ that can be a power voltage provided to the IC that houses the spindle motor power regulator system 102, and a low-voltage power 124, demonstrated as ground. Therefore, in the example of FIG. 2, the sets of switching signals SW_A, SW_B, and SW_C can be PWM digital signals that can each be separately asserted and de-asserted by the switching controller 108 in a commutation cycle. Accordingly, phase power transistors 116, 118, and 120 of the switching system 106 are activated and deactivated based on a predetermined PWM scheme to rotate the spindle motor.

As an example, the switching controller 108 can switch between commutation cycles, such as based on a desired rotation speed of the spindle motor. Each of the commutation cycles can be defined as two of the sets of the switching signals SW_A, SW_B, and SW_C having the same PWM frequency, with one of the two sets having a higher duty-cycle in each PWM period of the commutation cycle and the other of the two sets having a significantly lower duty-cycle in each PWM period of the commutation cycle. The remaining one of the sets of the switching signals SW_A, SW_B, and SW_C can have no PWM duty-cycle. As described herein, having no PWM duty-cycle is defined as a low-side transistor of the respective one of the phase power transistors 116, 118, and 120 being activated throughout the entirety of the commutation cycle, such that the respective phase is grounded throughout the entirety of the commutation cycle.

In this example, current monitor 112 that is configured to determine the magnitudes of the phase currents $I_{PH\_A}$, $I_{PH\_B}$, and $I_{PH\_C}$ that flow through the spindle motor 104 for each PWM cycle. The current monitor 112 includes a high-side current-sense system 126 and a low-side current-sense system 128. The high-side current sense system 126 is configured to measure a magnitude of a phase current (i.e., the CAP phase current) that is substantially constantly sourced to the respective phase of the spindle motor in a commutation cycle. As an example, the CAP phase current can identified as being the one of the phase-currents $I_{PH\_A}$, $I_{PH\_B}$, and $I_{PH\_C}$ resulting from the corresponding one of the sets of the switching signals SW_A, SW_B, and SW_C having the highest PWM duty-cycle in each PWM period of the commutation cycle. The low-side current sense system 128 is configured to measure a magnitude of a phase current (i.e., the GROUND phase current) that is substantially constantly sunk from the respective one of the phases to the low-voltage power rail 124 in the commutation cycle. As an example, the low-side sinking phase current can be the one of the phase-currents $I_{PH\_A}$, $I_{PH\_B}$, and $I_{PH\_C}$ resulting from the corresponding one of the sets of the switching signals SW_A, SW_B, and SW_C having no PWM duty-cycle.

Each of the high-side and low-side current sense systems 126 and 128 include a set of sense FETs 130 and, a set of phase switches 132, and an operational amplifier 134. As an example, for each of the high-side and low-side current sense systems 126 and 128, the set of sense FETs 130 can include a pair of matched FETs for each high-side and low-side transistor of phase power transistors 116, 118, and 120, respectively. The pairs of matched FETs can be configured, respectively, as LDMOSFETs that conduct reference current from a phase node associated with the respective power transistors 116, 118, and 120 and reference current from the respective one of the power rails 122 and 124 in response to the respective switching signals SW_X. As an example, each of the FETs in the sense FETs 130 can have a gate area that is smaller than the respective power transistors in phase power transistors 116, 118, and 120.

The phase switches 132 can be configured to switch the reference currents of the corresponding set of the sense FETs 130 to the operational amplifier 134 for measurement. Specifically, as described above, the high-side current sense system 126 is configured to measure the magnitude of the high-side sourcing phase current, and the low-side current sense system 128 is configured to measure the magnitude of the low-side sinking phase current. The switching controller 108 identifies which of the phase currents $I_{PH\_A}$, $I_{PH\_B}$, and $I_{PH\_C}$ is the high-side sourcing phase current that is to be measured and which of the phase currents $I_{PH\_A}$, $I_{PH\_B}$, and $I_{PH\_C}$ is the low-side sinking phase current that is to be measured. Specifically, the switching controller 108 generates phase control signals HS_PH and LS_PH that are provided to the phase switches 132 of the high-side and low-side current sense systems 126 and 128, respectively. The phase control signals HS_PH thus identifies which of the phase currents $I_{PH\_A}$, $I_{PH\_B}$, and $I_{PH\_C}$ is the high-side sourcing phase current that controls the CAP phase current and the phase control signals LS_PH thus identifies which of the phase currents $I_{PH\_A}$, $I_{PH\_B}$, and $I_{PH\_C}$ is the low-side sinking phase current that controls the GROUND phase. Therefore, the phase switches 132 can switch the corresponding reference currents provided from the sense FETs 130 corresponding to the high-side sourcing phase current and the low-side sinking phase current to the respective operational amplifiers 134 in response to the phase control signals HS_PH and LS_PH.

The operational amplifiers 134 are configured to measure the magnitudes of the high-side sourcing phase current and the low-side sinking phase current, respectively. Specifically, the operational amplifiers 134 can generate respective sense voltages $V_{SNS\_HS}$ and $V_{SNS\_LS}$ that have magnitudes that are proportional to (i.e., highly linear with respect to) the high-side sourcing phase current and the low-side sinking phase current, respectively, in response to the reference currents that are provided from the sense FETs 130 via the phase switches 132. The sense voltages $V_{SNS\_HS}$ and $V_{SNS\_LS}$ are each provided to an analog-to-digital converter (ADC) 136 that is configured to sample and convert the sense voltages $V_{SNS\_HS}$ and $V_{SNS\_LS}$ to respective digital values. As an example, the ADC 136 can sample one or more times during each PWM cycle depending on speed and torque control requirements for the spindle motor. The ADC 136 thus generates a digital signal DIG_CURR that is indicative of the magnitudes of the sense voltages $V_{SNS\_HS}$ and $V_{SNS\_LS}$.

The digital signal DIG_CURR is provided to a processor 138 that can be configured to calculate magnitudes of each of phase currents $I_{PH\_A}$, $I_{PH\_B}$, and $I_{PH\_C}$. As an example, the processor 138 can be configured to calculate the measured magnitudes of the CAP phase current and the GROUND phase current by implementing previous calibrated gains and offsets stored in the processor 138 and assuming a linear relationship from an ADC output value to a measured phase current. In addition, the processor 138 can be configured to calculate the magnitude of the remaining one of phase currents $I_{PH\_A}$, $I_{PH\_B}$, and $I_{PH\_C}$ (i.e., the SLOPE phase current) in response to the calculated magnitudes of the high-side sourcing phase current and the low-side sinking phase currents. This can, thus, allow the processor 138 and/or ADC 136 to form a feedback circuit.

As a result, because the magnitudes of the phase currents $I_{PH\_A}$, $I_{PH\_B}$, and $I_{PH\_C}$ are directly related to the commutation speed and torque of the spindle motor, the processor 138 can be configured to modify/control the commutation speed and torque of the spindle motor. In the example of FIG. 2, the processor 138 is demonstrated as generating a feedback control signal FDBK that is provided to the switching controller 108. Therefore, the switching controller 108 can adjust the pulse-width modulation scheme of the switching signals SW_A, SW_B, and SW_C in response to the feedback control signal FDBK. As an example, the feedback control signal FDBK can provide information as to how the pulse-width modulation of the switching signals SW_A, SW_B, and SW_C should be adjusted, or can provide information as to what the pulse-width modulation of the switching signals SW_A, SW_B, and SW_C should be to compensate for error in the commutation speed and torque of the spindle motor, such that the spindle motor can spin silently at a substantially constant speed.

It is to be understood that the spindle motor power regulator system 102 is not limited to the example of FIG. 2. As an example, one or more of the system components demonstrated in the example of FIG. 2 can be configured as part of or separately from other demonstrated system components. For example, the processor 138 can be incorporated into the switching controller 108, such that the ADC 136 provides the signal DIG_CURR directly to the switching controller 108. In addition, as demonstrated in greater detail below, additional signal interaction between the system components may be omitted from the example of FIG. 2. Thus, the spindle motor power regulator system 102 can be configured in any of a variety of ways.

Figure 3:
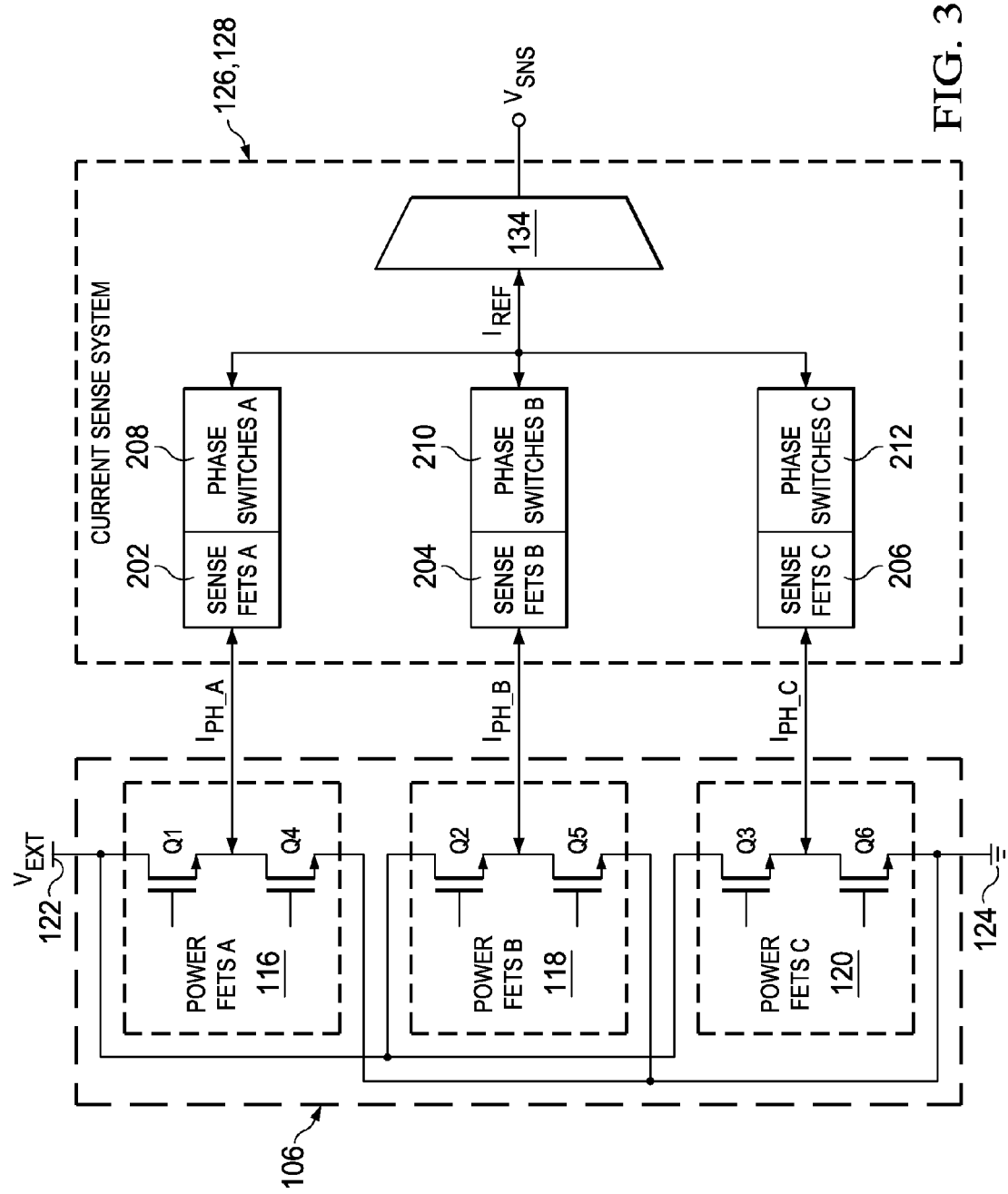
FIG. 3 illustrates an example of a current-sense system of FIG. 2.

Turning to FIG. 3, a more detailed example of a current-sense systems 126 and 128 can be seen. In the example of FIG. 3, phase power transistors 116, 118, and 120 are demonstrated as FETs. Specifically, phase power transistors 116 include a high-side power FET HS_A and a low-side power FET LS_A, the phase power transistors 118 include a high-side power FET HS_B and a low-side power FET LS_B, and phase power transistors 120 include a high-side power FET HS_C and a low-side power FET LS_C. Therefore, phase power transistors 116, 118, and 120 are responsive to the switching signals SW_A, SW_B, and SW_C, respectively (not shown in the example of FIG. 3), to generate the respective phase currents $I_{PH\_A}$, $I_{PH\_B}$, and $I_{PH\_C}$ by coupling the respective the phases of the spindle motor to either the high-voltage rail 122 (i.e., the voltage $V_{EXT}$) or the low-voltage rail 124 (i.e., ground).

In this example, the current sense systems 126 and 128 include sense FETs 202, sense FETs 204, and sense FETs 206 corresponding, respectively, to each of the phases of the spindle motor. In the example of FIG. 3, the phase current $I_{PH\_A}$ is demonstrated as being provided to sense FETs 202, the phase current $I_{PH\_B}$ is demonstrated as being provided to sense FETs 204, and the phase current $I_{PH\_C}$ is demonstrated as being provided to the sense FETs 206. It is to be understood that only a portion of each of the phase currents $I_{PH\_A}$, $I_{PH\_B}$, and $I_{PH\_C}$ may be provided to each of the respective sets of sense FETs 202, 204, and 206, as opposed to the entirety of the phase currents $I_{PH\_A}$, $I_{PH\_B}$, and $I_{PH\_C}$.

Each of the sets of sense FETs 202, 204, and 206 can include a pair of matched FETs for each of the high-side power FETs Q1, Q2, and Q3, respectively, when configured as the high-side current sense system 126. Alternatively, each of the sets of sense FETs 202, 204, and 206 can include a pair of matched FETs for each of the low-side power FETs Q4, Q5, and Q6, respectively, when configured as the low-side current sense system 128. The pairs of matched FETs can be configured, respectively, to conduct reference current from a phase node associated with the respective power FETs 116, 118, and 120 and reference current from the respective one of the power rails 122 and 124 in response to the respective switching signals SW_X. As an example, each of the FETs in the respective sets of sense FETs 202, 204, and 206 can have a gate area that is smaller than the respective high-side or low-side power FETs in phase power FETs 116, 118, and 120.

Coupled to the sets of sense FETs 202, 204, and 206 are respective sets of phase switches or switching circuits 208, 210, and 212, where, collectively, sense FETs 202, 204, and 206 and their respective phase switches 208, 210, and 212 can form sensing circuits. The sets of phase switches 208, 210, and 212 are configured to switch reference currents from one of the sets of sense FETs 202, 204, and 206, as well as one or more additional reference currents, such as a reference current that is also conducted from the respective phase node associated with one of the sets of sense FETs 202, 204, and 206 to the operational amplifier 134. In the example of FIG. 3, the reference currents that are provided to the operational amplifier 134 are demonstrated as currents $I_{REF}$. The switching of the currents $I_{REF}$ to the operational amplifier 134 can be in response to the phase control signals HS_PH for the high-side current sense system 126 or in response to the signals LS_PH for the low-side current sense system 128.

The operational amplifier 134 is thus configured to measure the magnitude of the respective one of the phase currents $I_{PH\_A}$, $I_{PH\_B}$, and $I_{PH\_C}$ based on the currents $I_{REF}$. For example, for the high-side current sense system 126, the switching controller 108 identifies which of the phase currents $I_{PH\_A}$, $I_{PH\_B}$, and $I_{PH\_C}$ is the high-side sourcing phase current (i.e., the CAP phase current) that is to be measured. The switching controller 108 thus provides the phase control signals HS_PH to the sets of phase switches 208, 210, and 212 to switch the currents $I_{REF}$ from the respective one of the sets of sense FETs 202, 204, and 206 corresponding to the high-side sourcing phase current to the operational amplifier 134 for the operational amplifier 134 to measure the magnitude of the high-side sourcing phase current. Similarly, for the low-side current sense system 116, the switching controller 108 identifies which of the phase currents $I_{PH\_A}$, $I_{PH\_B}$, and $I_{PH\_C}$ is the low-side sinking phase current (i.e., the GROUND phase current) that is to be measured. The switching controller 108 thus provides the signals LS_PH to the sets of phase switches 208, 210, and 212 to switch the currents $I_{REF}$ from the respective one of the sets of sense FETs 202, 204, and 206 corresponding to the low-side sinking phase current to the operational amplifier 134 for the operational amplifier 134 to measure the magnitude of the low-side sourcing phase current.

The operational amplifier 134 thus generates a sense voltage $V_{SNS}$ in response to the currents $I_{REF}$. The voltage $V_{SNS}$ can have a magnitude that is proportional to the magnitude of the measured one of the phase currents $I_{PH\_A}$, $I_{PH\_B}$, and $I_{PH\_C}$. As an example, the operational amplifier 134 can be configured to conduct approximately equal bias currents through respective current paths of the operational amplifier 134, such that the bias currents set a magnitude of the sense voltage $V_{SNS}$ to be proportional to the respective one of the phase currents $I_{PH\_A}$, $I_{PH\_B}$, and $I_{PH\_C}$. For example, the operational amplifier 134 can include a cascode amplifier that is controlled by one or both of the conducted bias currents. Accordingly, because the sense voltage $V_{SNS}$ generated by the operational amplifier 134 has a magnitude proportional to the magnitude of the high-side sourcing phase current or the low-side sinking phase current, the operational amplifier 134 is thus configured to measure the magnitude of the high-side sourcing phase current or the low-side sinking phase current.

It is to be understood that the current sense systems 126 and 128 in the example of FIG. 3, as well as the switching system 106, are demonstrated simplistically. As such, the signal interaction and interconnection between the current sense systems 126 and 128 and the switching system 106 are likewise demonstrated simplistically, such that a number of signals have been omitted and/or simplified in the example of FIG. 3. Furthermore, it is also to be understood that the current sense systems 126 and 128 is not limited to implementing the sets of sense FETs 202, 204, and 106, the sets of phase switches 208, 210, and 212, and/or the operational amplifier 134 to measure the respective one or more of the phase currents $I_{PH\_A}$, $I_{PH\_B}$, and $I_{PH\_C}$. Accordingly, the current sense systems 126 and 128 can be configured in any of a variety of ways.

Figure 4:
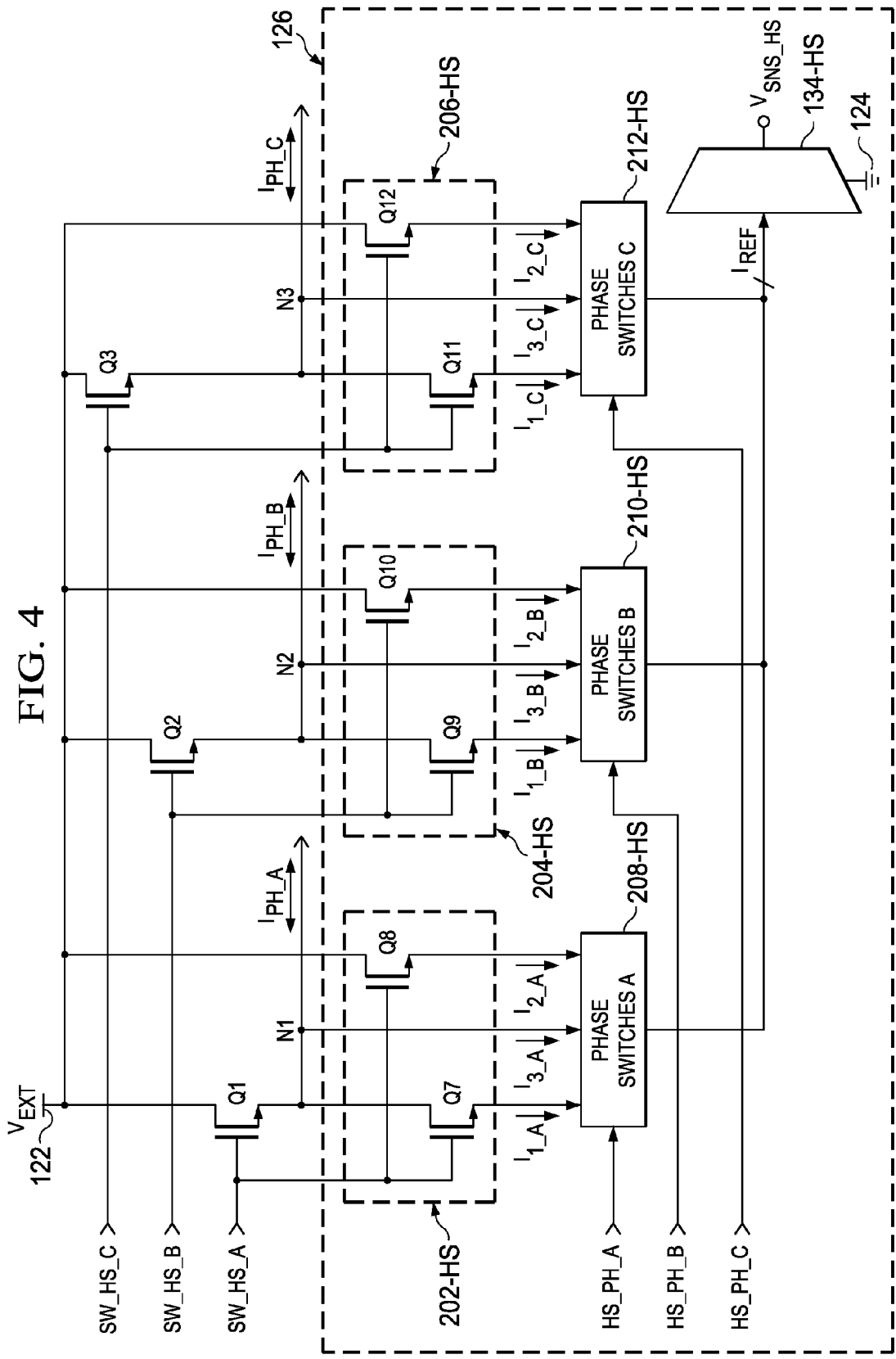
FIG. 4 illustrates an example of a high-side current-sense system of FIG. 2.

Turning to FIG. 4, a more detailed example of high-side current-sense system 126 can be seen. The high-side current-sense system 126 includes respective sets of sense FETs 202-HS, 204-HS, and 206-HS. In the example of FIG. 4, the sense FETs 202-HS are demonstrated as FETs Q7 and Q8 (which, as shown, are NFETs), the sense FETs 204-HS are demonstrated as FETs Q9 and Q10 (which, as shown, are NFETs), and the sense FETs 206-HS are demonstrated as FETs Q11 and Q12 (which, as shown, are NFETs). As an example, each of the FETs Q7 to Q12 can have a gate area that is less than the gate area of the high-side power FETs Q1, Q2, and Q3.

Each of FETs Q7 and Q8 are controlled at a gate by the high-side switching signal SW_HS_A that likewise controls the high-side power FET HS_A. Similarly, each of FETs Q9 and Q10 are controlled at a gate by the high-side switching signal SW_HS_B that likewise controls the high-side power FET HS_B, and each of FETs Q11 and Q12 are controlled at a gate by the high-side switching signal SW_HS_C that likewise controls the high-side power FET HS_C. FET Q7 is coupled at a drain to a phase node or output terminal N1 and is configured to conduct reference current $I_{1\_A}$ that is a first portion of the phase current $I_{PH\_A}$ in response to the high-side control signal SW_HS_A. FET Q8 is coupled at a drain to the high-voltage power rail 122 and is configured to conduct reference current $I_{2\_A}$ from the high-voltage power rail 122 in response to the high-side control signal SW_HS_A. Similarly, FET Q9 is coupled at a drain to a phase node or output terminal N2 and is configured to conduct reference current $I_{1\_B}$ that is a first portion of the phase current $I_{PH\_B}$ in response to the high-side control signal SW_HS_B. FET Q10 is coupled at a drain to the high-voltage power rail 122 and is configured to conduct reference current $I_{2\_B}$ from the high-voltage power rail 122 in response to the high-side control signal SW_HS_B. FET Q11 is coupled at a drain to a phase node or output terminal N3 and is configured to conduct reference current $I_{1\_C}$ that is a first portion of the phase current $I_{PH\_C}$ in response to the high-side control signal SW_HS_C. FET Q12 is coupled at a drain to the high-voltage power rail 122 and is configured to conduct reference current $I_{2\_C}$ from the high-voltage power rail 122 in response to the high-side control signal SW_HS_C. The high-side control signals SW_HS_A, SW_HS_B, and SW_HS_C can be analog activation signals that are generated from the respective high-side drivers in the switching control circuit 108 as demonstrated in the example of FIG. 2, and can thus constitute one of the switching signals SW_A, SW_B, and SW_C.

Reference currents $I_{1\_A}$ and $I_{2\_A}$, as well as reference current $I_{3\_A}$ that is conducted from the phase node N1, are provided to a set of phase switches 208-HS. The phase switches 208-HS are controlled by a set of phase control signals HS_PH_A. Similarly, reference currents $I_{1\_B}$ and $I_{2\_B}$, as well as reference current $I_{3\_B}$ that is conducted from the phase node N2, are provided to a set of phase switches 210-HS controlled by a set of phase control signals HS_PH_B. Furthermore, reference currents $I_{1\_C}$ and $I_{2\_C}$, as well as reference current $I_{3\_C}$ that is conducted from the phase node N3, are provided to a set of phase switches 212-HS controlled by a set of phase control signals HS_PH_C. The phase control signals HS_PH_A, HS_PH_B, and HS_PH_C can collectively correspond to the phase control signals HS_PH generated by the switching controller 108 in the example of FIG. 2.

It is to be understood that, based on the flow of reference currents $I_{1\_A}$ and $I_{3\_A}$ from the phase node N1, the magnitude of the current flow through the high-side power FET HS_A can be greater than the magnitude of the output current $I_{PH\_A}$ flowing from the phase node N1 to the load (not shown). However, the magnitude of reference currents $I_{1\_A}$ and $I_{3\_A}$ can be significantly less than the magnitude of the output current $I_{PH\_A}$, such that the difference in magnitudes between the current flow through the high-side power FET HS_A and the output current $I_{PH\_A}$ can be substantially negligible. It is also to be understood that the difference in magnitudes between the current flow through the high-side power FET HS_B and the output current $I_{PH\_B}$, as well as the current flow through the high-side power FET HS_C and the output current $I_{PH\_C}$, can likewise be substantially negligible.

The phase control signals HS_PH_A, HS_PH_B, and HS_PH_C are thus provided by the switching controller 108 to couple a respective one of the sets of reference currents $I_{1\_A}$, $I_{2\_A}$, and $I_{3\_A}$; $I_{1\_B}$, $I_{2\_B}$, and $I_{3\_B}$; and $I_{1\_C}$, $I_{2\_C}$, and $I_{3\_C}$ to an operational amplifier 134-HS. Therefore, the phase control signal HS_PH_A couples the reference currents $I_{1\_A}$, $I_{2\_A}$, and $I_{3\_A}$ to the operational amplifier 134-HS as the currents $I_{REF}$ via phase switches 208-HS. The phase control signals HS_PH_B and HS_PH_C thus disable phase switches 210-HS and 212-HS, respectively. Accordingly, the operational amplifier 134-HS can generate a high-side sense voltage $V_{SNS\_HS}$ that has a magnitude that is proportional to the magnitude of the phase current $I_{PH\_A}$. Similarly, the reference currents $I_{1\_B}$, $I_{2\_B}$, and $I_{3\_B}$ or the reference currents $I_{1\_C}$, $I_{2\_C}$, and $I_{3\_C}$ could instead be coupled to the operational amplifier 134-HS upon the switching controller 108 identifying that the phase current $I_{PH\_B}$ or $I_{PH\_C}$, respectively, is the CAP phase current, thus disabling the other two sets of the phase switches 208-HS, 210-HS, and 212-HS.

In addition to the coupling of the respective reference currents $I_{REF}$ to the operational amplifier 134-HS, the sets of phase switches 208-HS, 210-HS, and 212-HS can also be configured to split the respective sets of reference currents $I_{1\_A}$, $I_{2\_A}$, and $I_{3\_A}$; $I_{1\_B}$, $I_{2\_B}$, and $I_{3\_B}$; and $I_{1\_C}$, $I_{2\_C}$, and $I_{3\_C}$ into a sense current, a sense offset current, and a pair of bias currents that collectively form the currents $I_{REF}$. As an example, the pair of bias currents can be approximately equal bias currents that flow through respective current paths of the respective one of the sets of phase switches 208-HS, 210-HS, and 212-HS and the operational amplifier 134-HS, such that the bias currents set a magnitude of the sense current from which the high-side sense voltage $V_{SNS\_HS}$ is generated. Furthermore, the respective one of the sets of phase switches 208-HS, 210-HS, and 212-HS can be configured to pre-bias the electronic components of the operational amplifier 134-HS prior to the full activation of the respective one of the high-side power FETs HS_A, HS_B, and HS_C. Accordingly, transient effects that can affect the magnitude of the high-side sense voltage $V_{SNS\_HS}$ can be substantially mitigated.

Figure 5:
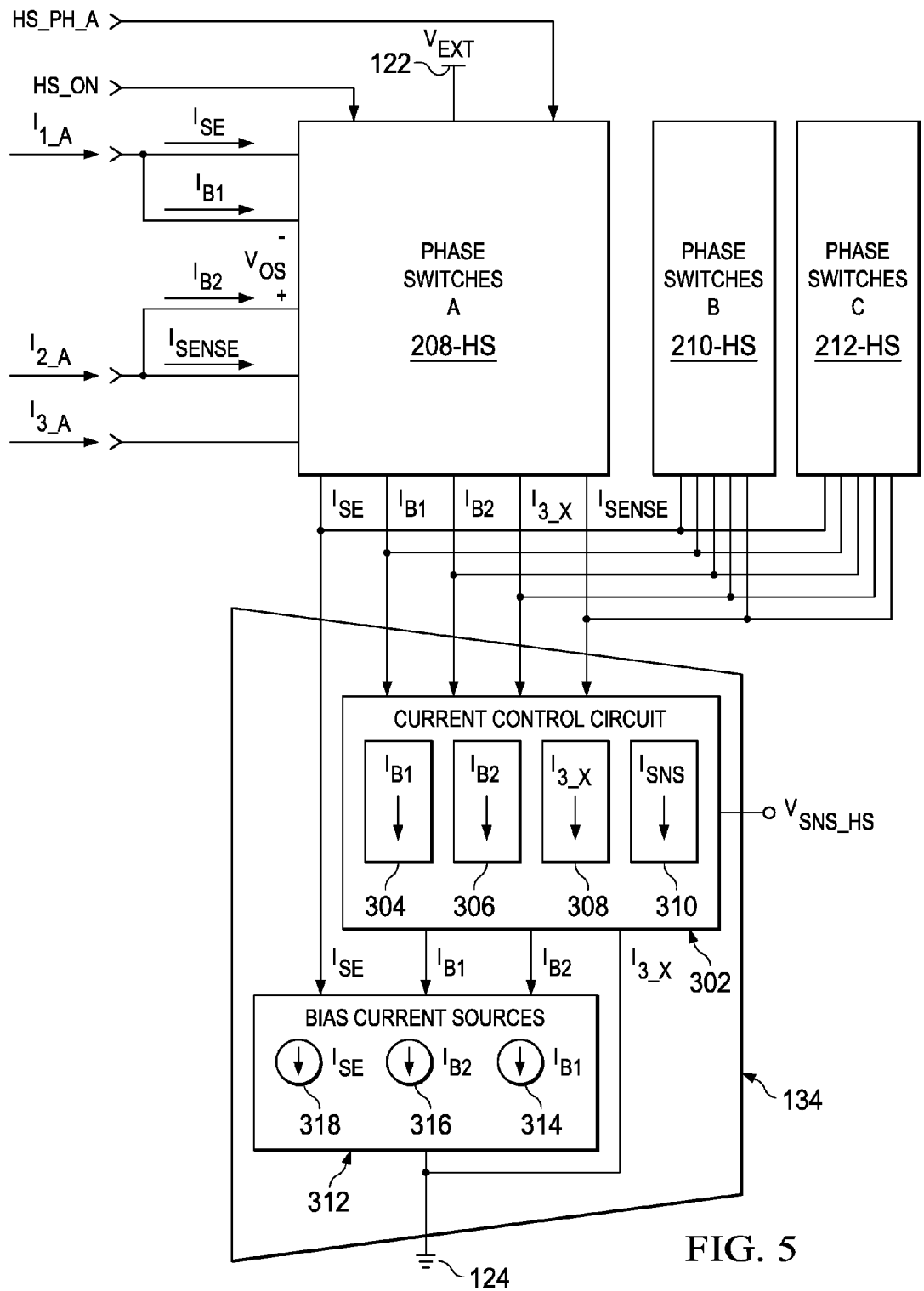
FIGS. 5 and 6 illustrate examples of phase switch and operational amplifier arrangements of FIG. 2.

Turning to FIG. 5, an example of an arrangement for phase switches 208-HS, 210-HS, and 212-HS and operational amplifier 134-HS can be seen. In the example of FIG. 5, upon being provided to phase switches 208-HS, reference current $I_{1\_A}$ is split into bias current $I_{B1}$ and sense offset current $I_{SE}$ and reference current $I_{2\_A}$ is split into bias current $I_{B2}$ and sense current $I_{SNS}$. As described in greater detail below, the sense offset current $I_{SE}$ can be generated from an exact current source, such that the sense offset current $I_{SE}$ can have a substantially constant magnitude. In addition, the phase control signal HS_PH_A and an activation signal HS_ON_A are also provided to the phase switches 208-HS. As an example, the phase control signal HS_PH_A and an activation signal HS_ON_A can each be a digital signal that controls an activation state of a plurality of switches in phase switches 208-HS, as described in greater detail below. As demonstrated in the example of FIG. 5, an operational amplifier input-referred offset voltage $V_{OS}$ having a minimal magnitude can exist between the inputs of the phase switches 208-HS that receive bias currents $I_{B1}$ and $I_{B2}$. For example, the magnitude of the offset voltage $V_{OS}$ can be based on process and temperature variations of the electronic components of the operational amplifier 134-HS.

As shown, the operational amplifier 134-HS includes a current control circuit 302. The current control circuit 302 includes current path 304 that conducts bias current $I_{B1}$, current path 306 that conducts bias current $I_{B2}$, current path 308 that conducts the reference current $I_{3\_A}$, and current path 310 that conducts the sense current $I_{SNS}$. As an example, current paths 304 and 306 can be configured substantially the same, such that bias currents $I_{B1}$ and $I_{B2}$ have approximately equal magnitudes. Specifically, current paths 304 and 306 can be configured as cascode current mirrors or a cascode amplifier to maintain high sensing linearity over a broad range of magnitudes of the respective phase current $I_{PH\_X}$. As another example, to increase the dynamic range of the sense current $I_{SNS}$ and reduce a systematic offset of the sense current $I_{SNS}$, current path 308 can be configured as a level-shifter that is controlled by at least one of current paths 304 and 306. Accordingly, the magnitude of the reference current $I_{3\_A}$ can be controlled by bias current $I_{B1}$ and/or $I_{B2}$. The output of the level-shifter in current path 308 can thus control a gate of a pass-MOSFET in current path 310 to generate the magnitude of the sense current $I_{SNS}$ in current path 310. The high-side sense voltage $V_{SNS\_HS}$, which is output from the current control circuit 302, can be generated from the sense current $I_{SNS}$.

The operational amplifier 134-HS further includes bias current sources or bias current circuit 312. The bias current sources 312 include bias current source 314 that conducts bias current $I_{B1}$, bias current source 316 that conducts bias current $I_{B2}$, and an input bias current source 318 that conducts the sense offset current $I_{SE}$. As an example, bias current sources 314 and 316 can be mirrored from a common current source, and the input bias current source 318 can be an exact current source, such that the sense offset current $I_{SE}$ has a substantially constant magnitude. For example, the sense offset current $I_{SE}$ can have a magnitude that is selected such that, upon the magnitude of the respective one of the phase currents $I_{PH\_A}$, $I_{PH\_B}$, and $I_{PH\_C}$ being approximately zero, the operational amplifier 134-HS can be properly biased to maintain sufficient loop gain and speed under all variations of the offset voltage $V_{OS}$.

As described above in the example of FIG. 4, the sets of phase switches 208-HS, 210-HS, and 212-HS can direct the respective reference currents $I_{1\_X}$, $I_{2\_X}$, and $I_{3\_X}$ to the operational amplifier 134-HS in response to the respective phase control signals HS_PH_A, HS_PH_B, and HS_PH_C. Specifically, upon determining which of the phase currents $I_{PH\_A}$, $I_{PH\_B}$, and $I_{PH\_C}$ is the CAP phase current, the phase control signals HS_PH_A, HS_PH_B, and HS_PH_C corresponding to the other two of the phase currents $I_{PH\_A}$, $I_{PH\_B}$, and $I_{PH\_C}$ can be implemented in a commutation cycle to de-couple the current control circuit 302 and/or the bias current sources 312 from the corresponding sets of sense FETs 202-HS, 204-HS, and 206-HS and the corresponding phase nodes N1, N2, and N3 from the operational amplifier 134-HS. In addition, the activation signal HS_ON_X corresponding to the CAP phase of the spindle motor phase through which high-side sourcing current flows can be implemented (e.g., de-asserted) prior to full activation of the respective one of the high-side power FETs HS_X via the high-side switching signal SW_HS_X to couple the current control circuit 302 to the voltage $V_{EXT}$.

As an example, in a PWM cycle of the CAP phase, the activation signal HS_ON_X can be asserted to indicate that the respective one of the high-side power FETs HS_X is nearly settled or fully activated in a first state, thus indicating that the CAP phase current is ready to be measured. For example, the activation signal HS_ON_X can be a substantially delayed version of the respective switching signal SW_HS_X based on an amount of time that it takes to activate the respective one of the high-side power FETs HS_X due to the large gate area of the respective one of the high-side power FETs HS_X. Similarly, the activation signal HS_ON_X can be de-asserted to indicate that the respective one of the high-side power FETs HS_X will be imminently deactivated or fully deactivated in a second state, thus indicating that the CAP phase current is not to be measured. Therefore, the electronic components in the current paths 304, 306, 308, and 310, as well as the bias current source 312, can be pre-biased at a substantially settled state. The pre-biasing of the electronic components in the current paths 304, 306, 308, and 310, as well as the bias current source 312 can thus substantially mitigate transient effects on the sense current $I_{SNS}$, such as in response to switching the high and low-side power FETs HS_X and LS_X of the CAP phase and can greatly improve sensing speed and accuracy.

Figure 6:
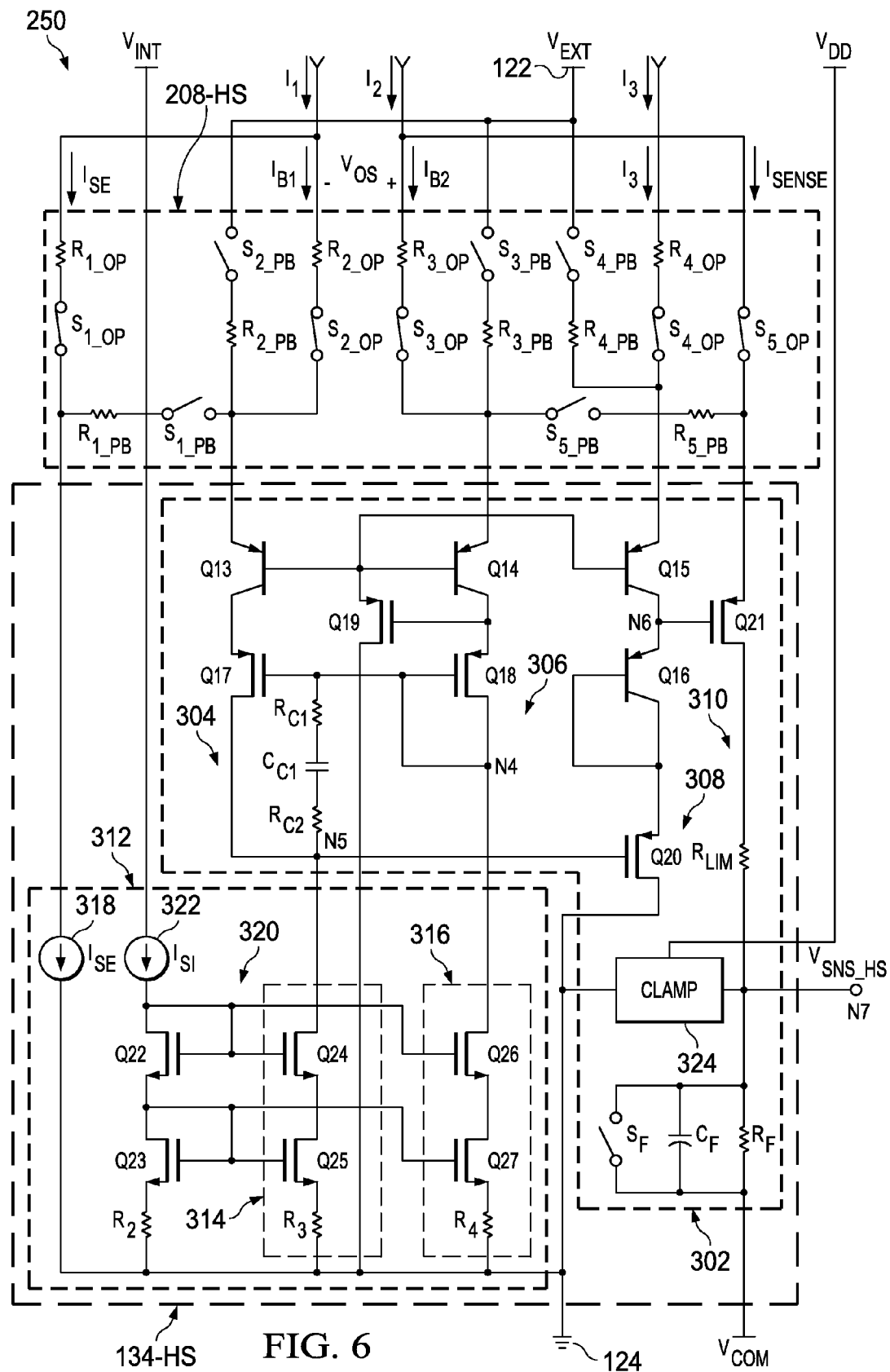

Turning to FIG. 6, a more detailed example of an arrangement between phase switches and operational amplifier 134-HS can be seen. The operational amplifier 134-HS includes the current control circuit 302 and the bias current sources 312. The current control circuit 302 includes current path 304 that conducts bias current $I_{B1}$ and current path 306 that conducts bias current $I_{B2}$. Each of current paths 304 and 306 include respective PNP bipolar junction transistors (BJTs) Q13 and Q14 in series with respective FETs Q17 and Q18 (which, as shown are PMOS transistors). The BJTs Q13 and Q14 are arranged in a cascoded current-mirror configuration via an interposing FET Q19 (which, as shown is a PMOS transistor) having a source that is coupled to the bases of the BJTs Q13 and Q14, a gate that is coupled to the collector of the BJT Q14, and a drain that is coupled to ground. Similarly, the FETs Q17 and Q18 are arranged in a current-mirror configuration based on the coupling of the respective gates of the FETs Q17 and Q18 and the drain of the FET Q18 at a node N4254. The cascoded current-mirror configuration of the BJTs Q13 and Q14 and FETs Q17 and Q18 is configured to substantially increase the open-loop gain of the operational amplifier 134-HS, to reduce a current mismatch between current paths 304 and 306 due to a limited output impedance of the BJTs Q13 and Q14, and to maintain substantially high-sensing linearity over a broad range of magnitudes of the respective phase current $I_{PH\_X}$.

In addition, the current control circuit 302 includes current path 308 that includes a PNP BJT Q15, a diode-configured PNP BJT Q16, and a FET Q20 (which, as shown, is a PMOS transistor). The base of the BJT Q15 is coupled to the bases of the BJTs Q13 and Q14, and the gate of FET Q20 is coupled to a node N5 that is coupled to the drain of the FET 17. Therefore, current path 308 is configured as a level-shifter having a current magnitude that is controlled by current paths 304 and 306. The output of the level-shifter of current path 308 is demonstrated in the example of FIG. 6 as a node N6 that controls a gate of a FET Q21 (which, as shown, is a PMOS transistor) through which the sense current $I_{SNS}$ flows in current path 310. The level-shifter can substantially increase the dynamic range of the sense current $I_{SNS}$ and substantially reduce the systematic offset of the sense current $I_{SNS}$. In addition, in the example of FIG. 6, the nodes N4 and N5 are separated by a series connection of a resistor $R_{C1}$, a capacitor $C_1$, and a resistor $R_{C2}$, with the resistors $R_{C1}$ and $R_{C2}$ having approximately the same resistance magnitude, that are configured to substantially increase a sensing speed in response to transients and to stabilize a frequency response associated with the operational amplifier 134-HS.

Additionally, the bias current sources 312 includes a current-mirror network 320 that is configured to generate bias current $I_1$ and bias current $I_2$. Specifically, the current-mirror network 320 includes a current source 322 configured to generate a current $I_{S1}$ that flows through FETs Q22 and Q23

(which, as shown, are NMOS transistors) and through a resistor $R_2$. As an example, the current source 322 can be generated from an internal voltage supply. The current-mirror network 320 also includes FETs Q24 and Q25 (which, as shown, are NMOS transistors) that are arranged in a current-mirror configuration with the FETs Q22 and Q23, respectively, and a resistor $R_3$ that is configured in series with the FETs Q26 and Q27 (which, as shown are NMOS transistors). The FETs Q24 and Q25 and the resistor $R_3$ thus constitutes bias current source 314 that conducts bias current $I_{B1}$. Similarly, the current-mirror network 320 also includes FETs Q26 and Q27 that are arranged in a current-mirror configuration with the FETs Q22 and Q23, respectively, and a resistor $R_4$ that is configured in series with the FETs Q26 and Q27. The FETs Q26 and Q27 and the resistor $R_4$ thus constitutes bias current source 316 that conducts bias current $I_{B2}$.

The set of phase switches 208-HS includes a plurality of resistors through which reference currents $I_{1\_X}$, $I_{2\_X}$, and $I_{3\_X}$ flow depending on the state of a plurality of switches in response to the activation signal HS_ON_X (not shown). Specifically, the set of phase switches 208-HS includes set of switches $S_{N\_OP}$ and switches $S_{N\_PB}$ that are mutually exclusively controlled by the activation signal HS_ON_X, where N is an integer from 1 to 5 as demonstrated in the example of FIG. 6. All of the resistors $R_{N\_PB}$ and $R_{N\_OP}$, as well as the resistors $R_2$, $R_3$ and $R_4$, can be substantially the same type of the resistors.

Each of the switches $S_{2\_PB}$, $S_{3\_PB}$, and $S_{4\_PB}$ interconnects the high power voltage rail 122 with respective resistors $R_{2\_PB}$, $R_{3\_PB}$, and $R_{4\_PB}$. The switch $S_{1\_PB}$ and respective resistor $R_{1\_PB}$ interconnect the current source 318 and current path 304 at the emitter of the BJT Q13, and the switch $S_{5\_PB}$ and respective resistor $R_{5\_PB}$ interconnect the source of the FET Q21 and current path 306 at the emitter of the BJT Q14. Thus, the switches $S_{X\_PB}$ are activated by de-asserting the activation signal HS_ON_X for pre-biasing the current control circuit 302, as described in greater detail below. Alternatively, the activation signal HS_ON_X is asserted to activate the switches $S_{N\_OP}$ to couple reference currents $I_{1\_X}$, $I_{2\_X}$, and $I_{3\_X}$ to the current control circuit 302 via the respective resistors $R_{N\_OP}$ (demonstrated by the state of the switches $S_{N\_OP}$ in the example of FIG. 6). Furthermore, it is to be understood that, upon reference currents $I_{1\_X}$, $I_{2\_X}$, and $I_{3\_X}$ being determined not to be associated with the high-side sourcing phase current, the corresponding phase control signal HS_PH_X can open all of the switches $S_{N\_OP}$ and $S_{N\_PB}$ to decouple reference currents $I_{1\_X}$, $I_{2\_X}$, and $I_{3\_X}$ from the operational amplifier 134-HS.

In the example of FIG. 6, the resistors $R_{2\_OP}$ and $R_{3\_OP}$ and their respective switches $S_{2\_OP}$ and $S_{3\_OP}$, the resistors $R_{2\_PB}$ and $R_{3\_PB}$ and their respective switches $S_{2\_PB}$ and $S_{3\_PB}$, the resistors $R_{1\_PB}$ and $R_{5\_PB}$ and their respective switches $S_{1\_PB}$ and $S_{5\_PB}$, the BJTs Q13 and Q14, the FETs Q17 and Q18, the FETs Q24 and Q26, the FETs Q25 and Q27, and the resistors $R_3$ and $R_4$ can all be matched components relative to each other, such that bias currents $I_{B1}$ and $I_{B2}$ have substantially equal magnitudes. As a result, the sense current $I_{SNS}$ can have a good power supply rejection ration (PSRR) with respect to the voltage $V_{EXT}$. The current source 322 that conducts the current $I_{S1}$, along with bias current sources 314 and 316 that conduct the respective currents $I_{B1}$, and $I_{B2}$, can be such that a voltage drop across the respective resistors $R_2$, $R_3$, and $R_4$ remains substantially constant under process and temperature variations. Furthermore, the bias current sources 312 include the input bias current source 318 that can be an exact current source that conducts the sense offset current $I_{SE}$.

In the example of FIG. 6, just prior to assertion of the activation signal HS_ON_X, the respective high-side power FET HS_X is about to be fully activated, and all of the switches $S_{N\_OP}$ are open and all of the switches $S_{N\_PB}$ are closed. Therefore, the input bias current source 318 conducts the sense offset current $I_{SE}$ from the voltage $V_{EXT}$ via the resistors $R_{1\_PB}$ and $R_{2\_PB}$, and bias current sources pull the respective bias currents $I_{B1}$ and $I_{B2}$ from the voltage $V_{EXT}$ via the respective resistors $R_{2\_PB}$ and $R_{3\_PB}$ and the respective current paths 304 and 306. Likewise, reference current $I_{3\_X}$ flows from the voltage $V_{EXT}$ via the resistor $R_{4\_PB}$ and through current path 308. The sense current $I_{SNS}$ flows from the voltage $V_{EXT}$ via the resistors $R_{3\_PB}$ and $R_{5\_PB}$ through the FET Q21 in current path 310. Thus, the sense current $I_{SNS}$ can remain at a magnitude that is substantially equal to the magnitude of the sense offset current $I_{SE}$. As a result, the current control circuit 302 and the bias current sources 312 are pre-biased at a substantially settled state. Accordingly, prior to the assertion of the activation signal HS_ON_X, the switching of the respective high-side and low-side power FETs HS_X and LS_X of the CAP phase has substantially no transient effect on the magnitude of the sense current $I_{SNS}$.

Upon the activation signal HS_ON_X being asserted, all of the switches $S_{N\_OP}$ are closed and all of the switches $S_{N\_PB}$ are opened (i.e., as demonstrated in the example of FIG. 6). Therefore, the sense offset current $I_{SE}$ and bias current $I_{B1}$ are conducted from reference current $I_{1\_X}$ (i.e., from sense FET Q7) via the resistors $R_{1\_OP}$ and $R_{2\_OP}$, respectively. Similarly, bias current $I_{B2}$ and the sense current $I_{SNS}$ are conducted from reference current $I_{2\_X}$ (i.e.; from sense FET Q8) via the resistor $R_{3\_OP}$ and the switch $S_{5\_OP}$, respectively. Likewise, reference current $I_{3\_X}$ is conducted from the respective one of the phase nodes N1, N2, and N3 via the resistor $R_{4\_OP}$, and has a magnitude that is based on the magnitudes of bias currents $I_{B1}$ and $I_{B2}$. The magnitude of the sense current $I_{SNS}$ is controlled by the voltage magnitude at the node N6.

The operational amplifier 134-HS thus begins to sense the magnitude of the respective phase current $I_{PH\_X}$. Because the current control circuit 302 and the bias current sources 312 are pre-biased at the substantially settled state and the respective high-side power FET HS_X is substantially fully activated, switching transient effects that could affect the magnitude of the sense current $I_{SNS}$ are substantially mitigated. As a result, the sense current $I_{SNS}$ can quickly settle for accurate sensing of the magnitude of the respective phase current $I_{PH\_X}$. The sensing speed and the sensing accuracy are thus substantially improved, particularly if the PWM frequency becomes too high and the PWM duty-cycle becomes too low for the CAP phase.

The operational amplifier 134-HS continues to track and sense the respective phase current $I_{PH\_X}$ until the activation signal HS_ON_X is de-asserted. At approximately the time that the activation signal HS_ON_X becomes de-asserted and the respective high-side power FET HS_X is nearly or fully activated, all of the switches in the set of phase switches 252 change state. As a result, the respective high-side power FET HS_N_X and the sense FETs Q7 and Q8 are all de-coupled from the operational amplifier 134-HS. Therefore, transient effects on the sense current $I_{SNS}$, such as in response to deactivation of the respective high power FETs HS_X, are substantially mitigated. While the activation signal HS_ON_X remains de-asserted, the sense current $I_{SNS}$ is held at approximately the same amplitude as the sense offset current $I_{SE}$, assuming no variation between the associated electronic components. As a result, the current control circuit 302 and the bias current sources 312 are pre-biased at a favorable settled state to await the next sense request via the next assertion of the activation signal HS_ON_X.

As described above, the current control circuit 302 includes current path 310 through which the sense current $I_{SNS}$ flows. Specifically, the sense current $I_{SNS}$ flows through the FET Q21 and a resistor $R_{LIM}$ to a common voltage $V_{COM}$ via a parallel connection of a resistor $R_F$, a capacitor $C_F$, and a switch $S_F$. As an example, the common voltage $V_{COM}$ can be a negative rail voltage having a magnitude that is selected based on an input dynamic range of the ADC 136 in the example of FIG. 2. As another example, the common voltage $V_{COM}$ can be ground, or can be greater than ground. The switch $S_F$ can be controlled by the activation signal HS_ON_X or can be substantially synchronized with the switches $S_{X\_PB}$. As an example, the switch $S_F$ can be opened during sensing of the respective phase current $I_{PH\_X}$, such as when the activation signal HS_ON_X is asserted or when the switches $S_{X\_PB}$ are opened. The switch $S_F$ can be closed when the activation signal HS_ON_X is de-asserted or when the switches $S_{X\_PB}$ are closed. As a result, the resistor $R_F$, the capacitor $C_F$, and the switch $S_F$ are configured to mitigate switching transients and/or other high-frequency noise associated with the sense current $I_{SENSE}$.

The sense current $I_{SNS}$ generates a sense voltage $V_{SNS\_HS}$ at a sensing node N7. The resistor $R_{LIM}$ is implemented to limit the magnitude of the sense current $I_{SNS}$, and to thus limit the sense voltage $V_{SNS\_HS}$ at the sensing node N7 based on the voltage drop across the resistor $R_{LIM}$. In addition, the operational amplifier 134-HS also includes a voltage clamp 324 that is coupled to the sensing node N7. The voltage clamp 324 is configured to clamp the magnitude of the sense voltage $V_{SNS\_HS}$, such as by shunting excess current to ground. As such, the magnitude of the sense voltage $V_{SNS\_HS}$ does not exceed the magnitude of a voltage $V_{DD}$. As an example, the voltage $V_{DD}$ can be an internally provided analog voltage supply for the ADC 136 that is generated at a magnitude that is less than the external voltage $V_{EXT}$. As a result, the ADC 136 can implement smaller, low-voltage electronic devices to conserve IC layout area.

Based on the above described operation of the operational amplifier 134-HS, the magnitude of the sense current $I_{SNS}$ during sensing of the respective phase current $I_{PH\_X}$ can be described by the following expression:

$$I_{SNS} = \left(\frac{I_{PH\_X}}{M_{PH\_X}}\right) + I_{OS\_X} + I_{SE}, \quad (1)$$

where $M_{PH\_X}$ is a proportionality constant of the size mirroring ratio of the high-side power FET, HS_X relative to the respective sense FETs Q7 through Q12, and $I_{OS\_X}$ is a sense offset current related to the respective high-side phase. As demonstrated by equation (1), a linear relationship exists between the magnitude of the sense current $I_{SNS}$ and the phase current $I_{PH\_X}$. To achieve the linear relationship, as demonstrated in Equation 1, the high-side power FET HS_X and the respective N-FETs Q7 through Q12 can be operating well within the triode/linear region. Based on equation (1), the sense voltage $V_{SNS\_HS}$ can thus be expressed as follows:

$$V_{SNS\_HS} = I_{SNS} * R_F = \left(\left(\frac{I_{PH\_X}}{M_{PH\_X}}\right) + I_{OS\_X} + I_{SE}\right) * R_F \quad (2)$$

As a result, the sense voltage $V_{SNS\_HS}$ has a magnitude that is proportional to the sense current $I_{SNS}$, and thus to the respective phase current $I_{PH\_X}$.

As described above, bias currents $I_{B1}$ and $I_{B2}$ have substantially equal magnitudes based on substantially matched electronic components in each of the set of phase switches 208-HS, the current control circuit 302, and the bias current sources 312. Such matching can improve PSRR of the sense current $I_{SNS}$ with respect to the voltage $V_{EXT}$. In addition, the source degeneration structure of each of the bias current sources 312 can improve matching of the bias currents $I_{B1}$ and $I_{B2}$, thus mitigating the magnitude of an input-referred offset voltage $V_{OS}$ of the set of phase switches 208-HS and the operational amplifier 134-HS, as well as possible noise contributions of the FETs Q25 and Q27. However, temperature and process variations in the electronic components of the set of phase switches 208-HS, the current control circuit 302, and the bias current sources 312 can result in the generation of an offset voltage $V_{OS}$ between the inputs of the set of phase switches 208-HS and the operational amplifier 134-HS that receive bias currents $I_{B1}$ and $I_{B2}$. The sources of the offset voltage $V_{OS}$ can be quantified based on a number of expressions.

A contribution $V_{OS1}$ to the offset voltage $V_{OS}$ can result from a mismatch in physical parameters between the FETs Q25 and Q27, as described by the following expression:

$$V_{OS1} = \left(\frac{A_\beta}{\sqrt{WL}}\right)_{N10,N12} * \frac{1}{1 + \frac{I_{SI} * R_b}{\left(\frac{V_{GS} - V_{th}}{2}\right)}} * (V_T + I_{SI} * R_{IN}), \quad (3)$$

where $A_\beta$ is a percentage mismatch parameter between the physical parameters of the FETs Q25 and Q27, WL is a theoretical area of the FETs Q25 and Q27, $R_b$ is an average resistance value of the resistors $R_2$ and $R_3$. $V_{GS}$ is a gate-source voltage of the FETs Q25 and Q27, Vth is a threshold voltage of the N-MOSFETs N10 and N12, $V_T$ is equal to k*T/q, and $R_{IN}$ is an average resistance value of the resistors $R_{2\_OP}$ and $R_{3\_OP}$ in series with the switches $S_{2\_OP}$ and $S_{3\_OP}$, respectively. A contribution $V_{OS2}$ to the offset voltage $V_{OS}$ can result from a mismatch in threshold voltage between the N-MOSFETs N10 and N12, as described by the following expression:

$$V_{OS2} = \left(\frac{A_{Vth}}{\sqrt{WL}}\right)_{N10,N12} * \frac{1}{\left(\frac{V_{GS} - V_{th}}{2}\right) + I_{SI} * R_b} * (V_T + I_{SI} * R_{IN}), \quad (4)$$

where $A_{Vth}$ is a voltage mismatch parameter between the threshold voltages of the FETs Q25 and Q27. A contribution $V_{OS3}$ to the offset voltage $V_{OS}$ can result from a mismatch in resistance magnitudes between the resistors $R_2$ and $R_3$, as described by the following expression:

$$V_{OS3} = \left(\frac{\Delta R_b}{R_b}\right) * \frac{1}{1 + \frac{I_{SI} * R_b}{\left(\frac{V_{GS} - V_{th}}{2}\right)}} * (V_T + I_{SI} * R_{IN}), \quad (5)$$

where $\Delta R_b$ is a resistance mismatch between the resistors $R_2$ and $R_3$. Equations (3) through (5) above thus represent contributions to the offset voltage $V_{OS}$ based on the FETs Q25 and Q27 operating in a strong inversion saturation region. A contribution $V_{OS4}$ to the offset voltage $V_{OS}$ can result from a mismatch in resistance magnitudes of the resistors $R_{2\_OP}$ and $R_{3\_OP}$ in series with the switches $S_{2\_OP}$ and $S_{3\_OP}$, respectively, as described by the following expression:

$$V_{OS4} = \left(\frac{\Delta R_{IN}}{R_{IN}}\right) * I_{SI} * R_{IN}, \quad (6)$$

where $\Delta R_{IN}$ is a resistance mismatch between the resistors $R_{2\_OP}$ and $R_{3\_OP}$ in series with the switches $S_{2\_OP}$ and $S_{3\_OP}$, respectively. A contribution $V_{OS5}$ to the offset voltage $V_{OS}$ can result from a mismatch in area of the BJTs Q13 and Q14, as described by the following expression:

$$V_{OS5} = \left(\frac{A_C}{\text{AREA}}\right)_{Q1,Q2} * V_T, \quad (7)$$

where $A_C$ is a percentage mismatch parameter between the collector currents of the BJTs Q13 and Q14, and AREA is a theoretical area of the BJTs Q13 and Q14. Based on Equations (3) through (7) above, a total magnitude of the offset voltage $V_{OS}$ can be described by the following expression:

$$V_{OS} = \sqrt{V_{OS1}^2 + V_{OS2}^2 + V_{OS3}^2 + V_{OS4}^2 + V_{OS5}^2} \quad (8)$$

A non-zero magnitude of the offset voltage $V_{OS}$ can thus contribute to offset associated with the sense current $I_{SNS}$.

The offset voltage $V_{OS}$ can be obtained by design optimization of these offset contributions based on equations (3) through (8) above. As a result, offset and gain can be digitally calibrated for each phase of the spindle motor. Specifically, referring back to the example of FIG. 2, the ADC 136 samples and converts the sense voltage $V_{SNS\_HS}$ across the resistor $R_F$. As an example, a full conversion voltage scale $V_{ADC\_FS}$ of the ADC 136 can be proportional to the resistance magnitude of the resistor $R_F$, such that the conversion digital output code of the ADC 136 is independent on any process variations of the resistor $R_F$. Assuming the full conversion voltage scale $V_{ADC\_FS}$ can be expressed as $I_{ADC\_REF} * R_{ADC}$, where $R_{ADC}$ approximately matches the resistor $R_F$ with a ratio of K and the current $I_{ADC\_REF}$ is the exact reference current, the sampled sense voltage $V_{SNS\_HS}$ can be expressed as a digital value $D_{ADC\_OUT}$. Specifically, referring back to equation (2), the digital value $D_{ADC\_OUT}$ can be expressed as follows:

$$D_{ADC\_OUT} = \frac{V_{SNS\_HS}}{V_{ADC\_FS}} = \frac{I_{SNS} * R_F}{I_{ADC\_REF} * R_{ADC}} = \frac{\left(\left(\frac{I_{PH\_X}}{M_{PH\_X}}\right) + I_{OS\_X} + I_{SE}\right)}{I_{ADC\_REF} * K} \quad (9)$$

Equation (9) also demonstrates the digital value for the magnitude of the respective one of the phase currents $I_{PH\_A}$, $I_{PH\_B}$, and $I_{PH\_C}$ that is the high-side sourcing phase current. Based on equation (9), a linear relationship between the respective phase current $I_{PH\_X}$ and the respective digital value $D_{ADC\_OUT}$ can be described by the following expressions:

$$I_{PH\_X} = \text{GAIN}_{PH\_X} * D_{ADC\_OUT} - \text{OFFSET}_{PH\_X} \quad (10)$$

$$\text{OFFSET}_{PH\_X} = M_{PH\_X} * (I_{OS\_X} + I_{SE}) \quad (11)$$

$$\text{GAIN}_{PH\_X} = K * M_{PH\_X} * I_{ADC\_REF} \quad (12)$$

The offset and gain associated with each high-side phase can vary with process and temperature variations. In order to accurately sense the respective one of the phase currents $I_{PH\_A}$, $I_{PH\_B}$, and $I_{PH\_C}$, and the offset and gain calibration can be performed for each high-side phase of the spindle motor. For example, in the example of FIG. 2, the respective known high-side sourcing phase currents $I_{PH\_A}$, $I_{PH\_B}$, and $I_{PH\_C}$ can be provided to the spindle motor power regulator system 102, such as during operation of the spindle motor or externally through the respective high-side power transistors 116, 118 and 120. The high-side current sense system 126 and the ADC 136 can be configured to measure the magnitude of the respective known phase currents $I_{PH\_A}$, $I_{PH\_B}$, and $I_{PH\_C}$ and to generate the respective digital value, respectively. An optimization algorithm or routine can be employed to perform the calibration and extract and store conversion gain and/or offset information for each phase. As an example, the processor 138 can store the respective high-side gains $\text{GAIN}_{PH\_A}$, $\text{GAIN}_{PH\_B}$, and $\text{GAIN}_{PH\_C}$ and the respective high-side offsets $\text{OFFSET}_{PH\_A}$, $\text{OFFSET}_{PH\_B}$, and $\text{OFFSET}_{PH\_C}$ in the digital format. The processor 138 can thus implement the stored high-side gain and/or offset information to subsequently calculate the respective high-side sourcing phase currents $I_{PH\_A}$, $I_{PH\_B}$, and $I_{PH\_C}$ by implementing equation (10).

It is to be understood that the phase switch and operational amplifier circuit 250 is not intended to be limited to the example of FIG. 6. As an example, additional circuit configurations for each of the set of phase switches 208-HS, 210-HS, and 212-HS, current control circuit 302, and the bias current sources 312 are conceivable for the phase switches 208-HS, 210-HS, and 212-HS and operational amplifier 134-HS. Accordingly, phase switches 208-HS, 210-HS, and 212-HS and operational amplifier 134-HS can be configured in any of a variety of ways.

Figure 7:
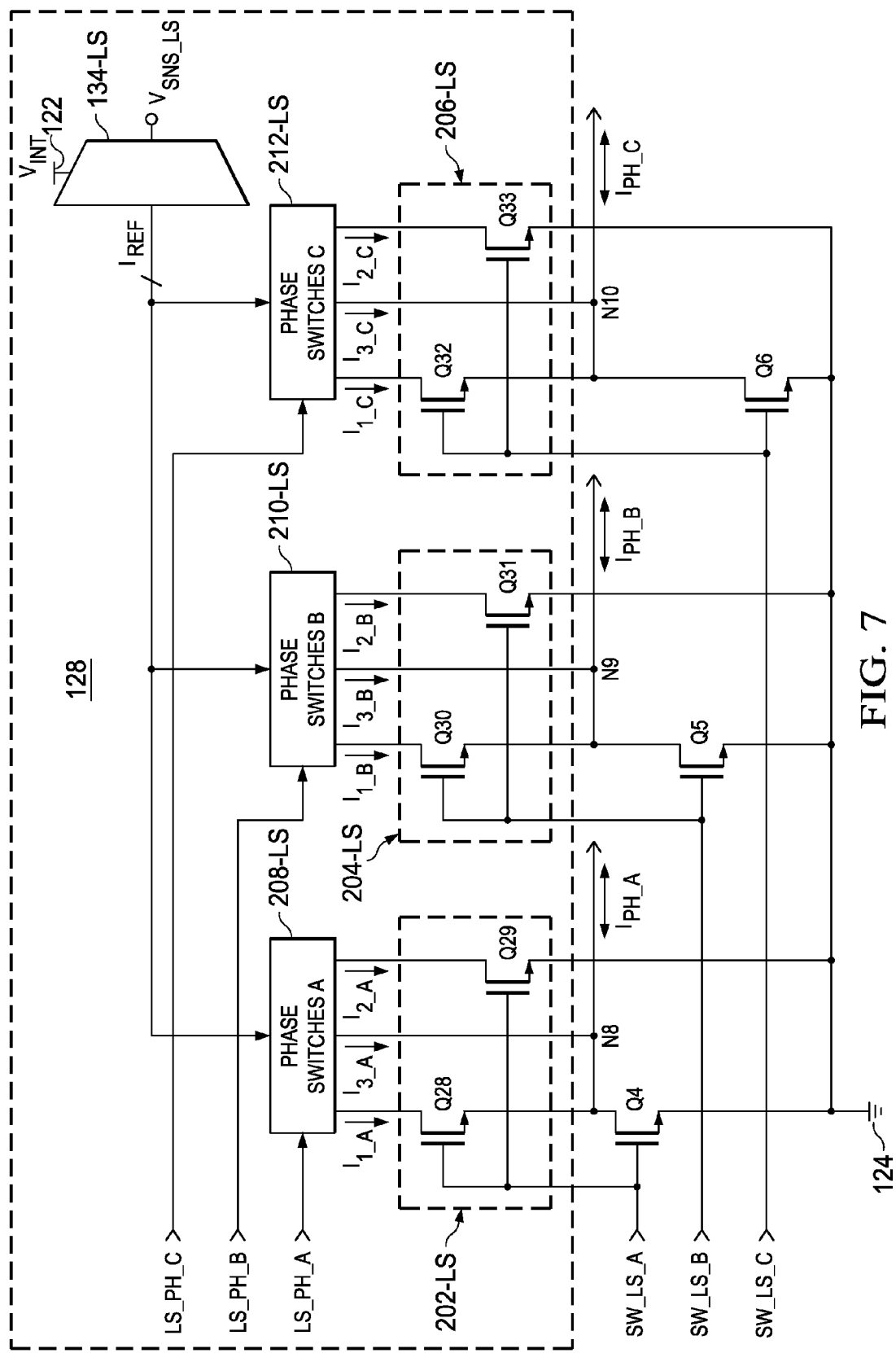
FIG. 7 illustrates an example of a low-side current-sense of FIG. 2.

Turning to FIG. 7, a more detailed example of a low-side current-sense system 128 can be seen. Similar to as described above in the example of FIG. 2, the low-side current-sense system 128 is configured to monitor a magnitude of one of the phase currents $I_{PH\_A}$, $I_{PH\_B}$, or $I_{PH\_C}$ that flows through a respective one of the low-side power FETs, demonstrated in the example of FIG. 7 as low-side power FETs Q4. The low-side current-sense system 128 includes respective sets of sense FETs 208-LS, 210-LS, and 212-LS. In the example of FIG. 7, the sense FETs 208-LS are demonstrated as FETs Q28 and Q29 (which, as shown, are NMOS transistors), the sense FETs 210-LS are demonstrated as FETs Q30 and Q31 (which, as shown, are NMOS transistors), and the sense FETs 212-LS are demonstrated as FETs Q32 and Q33 (which, as shown, are NMOS transistors). As an example, each of the FETs Q28 through Q33 can have a gate area that is less than the gate area of the low-side power FETs Q4, Q5, and Q6.

Each of FETs Q28 and Q29 are controlled at a gate by the low-side switching signal SW_LS_A that likewise controls the low-side power FET LS_A. Similarly, each of the third and fourth FETs Q30 and Q31 are controlled at a gate by the low-side switching signal SW_LS_B that likewise controls the low-side power FET LS_B, and each of the fifth and sixth FETs Q32 and Q33 are controlled at a gate by the low-side switching signal SW_LS_C that likewise controls the low-side power FET LS_C. FET Q28 is coupled at a source to the phase node N8 and is configured to conduct reference current $I_{1\_A}$ that is a first portion of the phase current $I_{PH\_A}$ in response to the low-side control signal SW_LS_A. FET Q29 is coupled at a source to the low-voltage power rail 124 and is configured to conduct reference current to the low-voltage power rail 124 in response to the low-side control signal SW_LS_A. Similarly, FET Q30 is coupled at a source to the phase node N9 and is configured to conduct reference current $I_{1\_B}$ that is a first portion of the phase current $I_{PH\_B}$ in response to the low-side control signal SW_LS_B. FET Q31 is coupled at a source to the low-voltage power rail 124 and is configured to conduct reference current $I_{2\_B}$ from the low-voltage power rail 124 in response to the low-side control signal SW_LS_B. FET Q32 is coupled at a source to the phase node N10 and is configured to conduct reference current $I_{1\_C}$ that is a first portion of the phase current $I_{PH\_C}$, in response to the low-side control signal SW_LS_C. FET Q33 is coupled at a drain to the low-voltage power rail 124 and is configured to conduct reference current from the low-voltage power rail 124 in response to the low-side control signal SW_LS_C.

It is to be understood that the low-side control signals SW_LS_A, SW_LS_B and SW_LS_C can be analog activation signals that are generated from the respective low-side drivers in the switching control circuit 108 as demonstrated in the example of FIG. 2, and can thus constitute one of the switching signals SW_A, SW_B and SW_C. In addition, the phase nodes N8, N9 and N10 in the example of FIG. 7 can be the same nodes corresponding, respectively, to the phase nodes N1, N2 and N3 in the example of FIG. 4. Furthermore, the drains of the FETs Q28, Q30, and Q32 in the example of FIG. 7 can be connected respectively with the sources of the FETs Q7, Q9, and Q11 in the example of FIG. 4.

Reference currents $I_{1\_A}$ and $I_{2\_A}$, as well as reference current $I_{3\_A}$ that is conducted from the phase node N8, are provided to a set of phase switches 208-LS. The phase switches 208-LS are controlled by a set of phase control signals LS_PH_A. Similarly, reference currents $I_{1\_B}$ and $I_{2\_B}$, as well as reference current $I_{3\_B}$ that is conducted from the phase node N9, are provided to a set of phase switches 210-LS controlled by a set of phase control signals LS_PH_B. Furthermore, reference currents $I_{1\_C}$ and $I_{2\_C}$, as well as reference current $I_{3\_C}$ that is conducted from the phase node N10, are provided to a set of phase switches 318 controlled by a set of phase control signals LS_PH_C. The phase control signals LS_PH_A, LS_PH_B, and LS_PH_C can collectively correspond to the phase control signals LS_PH generated by the switching controller 108 in the example of FIG. 2.

It is to be understood that, based on the flow of reference currents $I_{1\_A}$ and $I_{3\_A}$ into the phase node N1, the magnitude of the current flow through the low-side power FET LS_A can be greater than the magnitude of the output current $I_{PH\_A}$ flowing into the phase node N1 from the load (not shown). However, the magnitude of reference currents $I_{1\_A}$ and $I_{3\_A}$ can be significantly less than the magnitude of the output current $I_{PH\_A}$, such that the difference in magnitudes between the current flow through the low-side power FET LS_A and the output current $I_{PH\_A}$, can be substantially negligible. It is also to be understood that the difference in magnitudes between the current flow through the low-side power FET LS_B and the output current $I_{PH\_B}$, as well as the current flow through the low-side power FET LS_C and the output current $I_{PH\_C}$, can likewise be substantially negligible.

The phase control signals LS_PH_A, LS_PH_B, and LS_PH_C are thus provided by the switching controller 108 to switch a respective one of the sets of reference currents $I_{1\_A}, I_{2\_A}$, and $I_{3\_A}$; $I_{1\_B}, I_{2\_B}$, and $I_{3\_B}$; and $I_{1\_C}, I_{2\_C}$, and $I_{3\_C}$ from an operational amplifier 134-LS. Therefore, the phase control signal LS_PH_A switches currents $I_{REF}$ generated from the operational amplifier 134-LS as the reference currents $I_{1\_A}, I_{2\_A}$, and $I_{3\_A}$ via the phase switches 208-LS. The phase control signals LS_PH_B and LS_PH_C thus disable phase switches 210-LS and 212-LS, respectively. Accordingly, the operational amplifier 134-LS can generate a low-side sense voltage $V_{SNS\_LS}$ that has a magnitude that is proportional to the magnitude of the phase current $I_{PH\_A}$. Similarly, the reference currents $I_{1\_B}, I_{2\_B}$, and $I_{3\_B}$ or the reference currents $I_{1\_C}, I_{2\_C}$ and $I_{3\_C}$ could instead be switched from the operational amplifier 134-LS upon the switching controller 108 identifying that the phase current $I_{PH\_B}$ or $I_{PH\_C}$, respectively, is the low-side sinking phase current, thus disabling the other two sets of the phase switches 208-LS, 210-LS, and 212-LS.

In addition to the coupling of the respective reference currents $I_{REF}$ from the operational amplifier 134-LS, the sets of phase switches 208-LS, 210-LS, and 212-LS can also be configured to split the respective sets of reference currents $I_{1\_A}, I_{2\_A}$, and $I_{3\_A}$; $I_{2\_B}$, and $I_{3\_B}$; and $I_{1\_C}, I_{2\_C}$, and $I_{3\_C}$ into a sense current, a sense offset current, and a pair of bias currents that collectively form the currents $I_{REF}$, similar to as described above regarding the high-side current sense system 126. As an example, the pair of bias currents can be approximately equal bias currents that flow through respective current paths of the respective one of the sets of phase switches 208-LS, 210-LS, and 212-LS and the operational amplifier 134-LS, such that the bias currents set a magnitude of the sense current from which the low-side sense voltage $V_{SNS\_LS}$ is generated. Furthermore, the respective one of the sets of phase switches 208-LS, 210-LS, and 212-LS can be configured to pre-bias the electronic components of the operational amplifier 134-LS prior to the full activation of the respective one of the low-side power FETs LS_A, LS_B, and LS_C. Accordingly, transient effects that can affect the magnitude of the low-side sense voltage $V_{SNS\_LS}$ can be substantially mitigated.

Based on the above description of the low-side current-sense circuit 128, it is demonstrated that the low-side current-sense circuit 128 operates substantially similar to the high-side current-sense circuit 126. As an example, the operational amplifier 134-LS in the example of FIG. 7 can be configured as a substantially inverted version of the operational amplifier 134-HS in the example of FIG. 6, such as to include a reversed current-flow direction of reference currents $I_{1\_X}$ and $I_{2\_X}$, and thus also of bias currents $I_{B1}$ and $I_{B2}$. For example, the operational amplifier 134-LS can include a current control circuit, similar to the current control circuit 302, that includes NPN BJTs and N-MOSFETs in the current paths for bias currents $I_{B1}$ and $I_{B2}$ and the reference current $I_{3\_X}$. Similarly, the operational amplifier 134-LS can include bias current sources that conduct the currents $I_{SE}, I_{SF}, I_{B1}$, and $I_{B2}$ from the voltage $V_{INT}$ or the voltage $V_{EXT}$ at the positive voltage rail 122, such as via P-MOSFETs in the case of the currents $I_{SF}, I_{B1}$, and $I_{B2}$.

Furthermore, it is to be understood that the direction of the flow of the low-side sense current can be from an internal voltage $V_{COM}$ to the respective one of sense FETs Q29, Q31, and Q33, or can be changed by adding one or more current mirrors to the operational amplifier 134-LS. Accordingly, the low-side current-sense system 128 can be configured in any of a variety of ways. It is also to be understood that, in order to accurately sense the respective one of the phase currents $I_{PH\_A}, I_{PH\_B}$, and $I_{PH\_C}$, the spindle motor power regulator system 102 in the example of FIG. 2 can be configured to perform the offset and gain calibration for each low-side phase of the spindle motor. The processor 138 can thus implement the stored low-side gain and/or offset information to subsequently calculate the respective low-side sourcing phase currents $I_{PH\_A}, I_{PH\_B}$, and $I_{PH\_C}$ by implementing equation (10).

Figure 8:
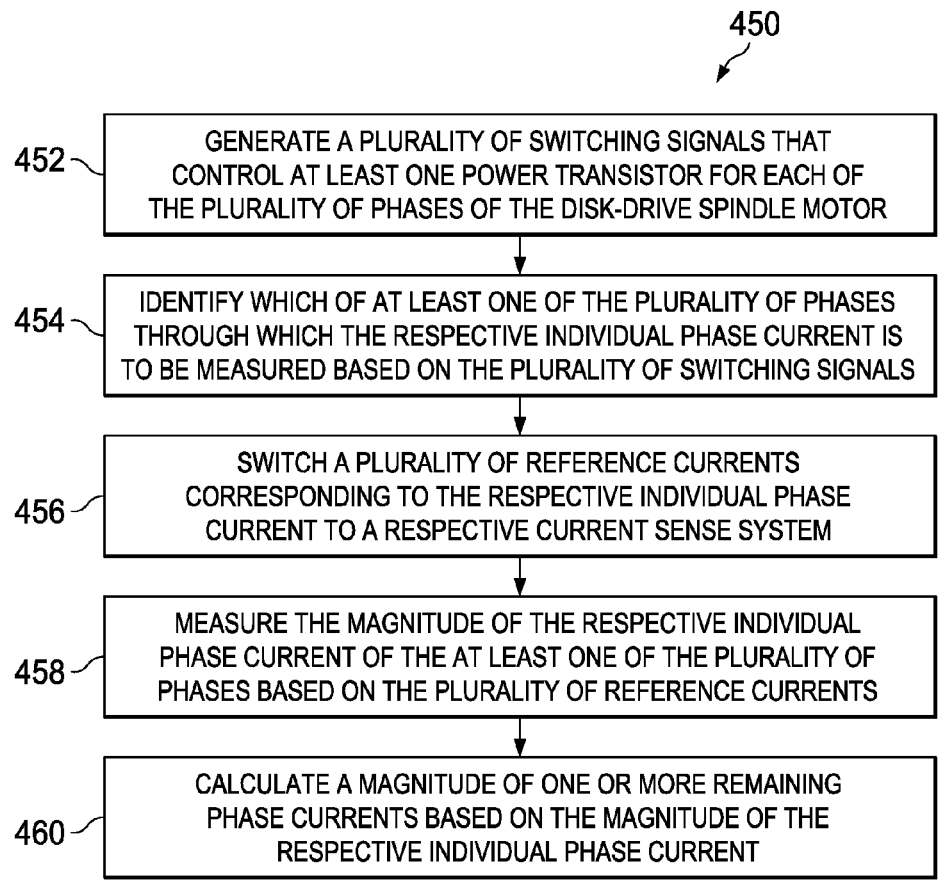
FIG. 8 illustrates an example of a method for determining individual phase currents of a disk-drive spindle motor using the spindle motor power regulator system of FIGS. 1 and 2.

In view of the foregoing structural and functional features described above, certain methods will be better appreciated with reference to FIG. 8. It is to be understood and appreciated that the illustrated actions, in other embodiments, may occur in different orders and/or concurrently with other actions. Moreover, not all illustrated features may be required to implement a method.

FIG. 8 illustrates an example of a method 450 for determining individual phase currents of a disk-drive spindle motor in accordance with an aspect of the invention. At 452, a plurality of switching signals that control at least one power transistor are generated for each of the plurality of phases of the disk-drive spindle motor. The switching signals can be provided from a switching controller, and can be provided to a set of power transistors, such as a high-side and low-side power FET for each phase of the spindle motor. At 454, it is identified which of at least one of the plurality of phases through which the respective individual phase current is to be measured based on the plurality of switching signals. The measurement can be a CAP phase current, which can be a current that is substantially constantly sourced to one of the phases of the spindle motor in a commutation cycle, and of a GROUND phase current, which can be a current that is substantially constantly sunk from a second one of the phases of the spindle motor to a low-voltage power rail. The identification can be based on the switching signal having the greatest PWM duty-cycle in each PWM period of the commutation cycle in the case of the CAP phase current (i.e., relative to a SLOPE phase current) and the switching signal having no PWM duty-cycle in the case of the low-side sinking phase current.

At 456, a plurality of reference currents corresponding to the respective individual phase current are switched to a respective current sense system. The respective current sense system can include a high-side current sense system to measure the high-side sourcing phase current and a low-side current sense system to measure the low-side sinking phase current. The reference currents can be generated from a respective plurality of sense FETs arranged with respect to the respective one of the high-side or low-side FETs through which the respective phase current flows. At 458, the magnitude of the respective individual phase current of the at least one of the plurality of phases is measured based on the plurality of reference currents. A sense voltage having a magnitude that is proportional to the magnitude of the respective phase current can be generated from an operational amplifier in response to the reference currents.

At 460, a magnitude of one or more remaining phase currents is calculated based on the magnitude of the respective individual phase current. The phase voltage(s) can be provided to an ADC that converts the sense voltage to a digital value. The digital value of the high-side sourcing phase current and the low-side sinking phase current can be used to calculate the magnitude of the third phase current of the spindle motor. The digital values can also be implemented in a calibration routine for the subsequent measurement of the CAP phase currents. For example, the sourcing current can be measured individually through each of the phases of the spindle motor, and offset and/or gain information can be ascertained from the digital values. The offset and/or gain information can then be implemented in subsequent measurements of the CAP phase current through each of the phases of the spindle motor. Therefore, the magnitude of all three phase currents of the spindle motor can be identified by a respective processor, such that commutation speed information associated with the spindle motor can be implemented to adjust and/or control the rotation speed of the spindle motor.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A disk-drive spindle motor power regulator system comprising:
a switching system comprising at least one power transistor for each of a plurality of phases of a disk-drive spindle motor;
a switching controller configured to generate a plurality of switching signals configured to control the at least one power transistor for each of the plurality of phases of the disk-drive spindle motor;
a current monitor configured to measure a magnitude of an individual phase current through at least one of the plurality of phases of the disk-drive spindle motor, wherein the current monitor includes at least one current sense system having:
a first sense transistor configured to conduct a first reference current one of to and from a phase node associated with the respective one of the plurality of phases of the disk-drive spindle motor;
a second sense transistor configured to conduct a second reference current one of to and from a power rail; and
an operational amplifier configured to receive the first reference current, the second reference current, and a third reference current that flows one of to and from the phase node associated with the respective one of the plurality of phases of the disk-drive spindle motor and to generate a sense voltage that is substantially proportional to the individual phase current.

2. The system of claim 1, wherein the current monitor is configured to measure a first phase current that is substantially constantly sourced to a respective first one of the plurality of phases of the disk-drive spindle motor in a commutation cycle and to measure a magnitude of a second phase current that is substantially constantly sunk from a respective second one of the plurality of phases of the disk-drive spindle motor to a low voltage power rail in the commutation cycle.

3. The system of claim 1, wherein the first sense transistor and the second sense transistor comprise a first of a plurality of sense transistor pairs that each correspond to a respective one of the plurality of phases of the spindle motor, and wherein the operational amplifier comprises a switching control circuit that is configured to selectively couple the operational amplifier with one of the plurality of sense transistor pairs for the operational amplifier to measure the corresponding individual phase current.

4. The system of claim 3, wherein the switching system couples the operational amplifier to the respective one of the plurality of sense transistor pairs in response to a set of phase control signals for the operational amplifier to measure one of a magnitude of a first phase current that is substantially constantly sourced to a respective first one of the plurality of phases of the disk-drive spindle motor in a commutation cycle and a magnitude of a second phase current that is substantially constantly sunk from a respective second one of the plurality of phases of the disk-drive spindle motor to a low voltage power rail in the commutation cycle.

5. The system of claim 1, wherein the system is an integrated circuit.

6. A disk-drive spindle motor power regulator system comprising:
- a switching system comprising at least one power transistor for each of a plurality of phases of a disk-drive spindle motor, wherein the plurality of phases comprises three phases;
- a switching controller configured to generate a plurality of switching signals configured to control the at least one power transistor for each of the plurality of phases of the disk-drive spindle motor;
- a current monitor configured to measure a magnitude of an individual phase current through at least one of the plurality of phases of the disk-drive spindle motor, wherein the current monitor includes at least one current sense system having:
  - a high-side current sense system configured to measure a first phase current that is substantially constantly sourced to a respective first one of the plurality of phases of the disk-drive spindle motor in a commutation cycle based on a respective first one of the plurality of switching signals having a greatest duty-cycle in each pulse width modulation (PWM) period of the commutation cycle; and
  - a low-side current sense system configured to measure a magnitude of a second phase current that is substantially constantly sunk from a respective second one of the plurality of phases of the disk-drive spindle motor to a low voltage power rail in the commutation cycle based on a respective second one of the plurality of switching signals having no duty-cycle.

7. The system of claim 6, wherein the high-side current sense system is further configured to generate a high-side sense voltage that is proportional to a magnitude of the first phase current and wherein the low-side current sense system is further configured to generate a low-side sense voltage that is proportional to a magnitude of the second phase current, and wherein the current monitor further comprises:
- an analog-to-digital converter (ADC) configured to convert each of the first and second sense voltages to digital values corresponding to the magnitudes of the first and second phase currents, respectively; and
- a processor configured to calculate a magnitude of a third phase current based on the digital values and to generate a feedback control signal corresponding to a commutation speed of the disk-drive spindle motor.

8. A method for determining individual phase currents of a disk-drive spindle motor, the method comprising:
- generating a plurality of switching signals that control at least one power transistor for each of the plurality of phases of the disk-drive spindle motor;
- identifying which of at least one of the plurality of phases through which the respective individual phase current is to be measured based on the plurality of switching signals;
- switching a plurality of reference currents corresponding to the respective individual phase current to a respective current sense system;
- measuring the magnitude of the respective individual phase current of the at least one of the plurality of phases based on the plurality of reference currents; and
- calculating a magnitude of one or more remaining phase currents based on the magnitude of the respective individual phase current.

9. The method of claim 8, wherein identifying which of the at least one of the plurality of phases through which the respective individual phase current is measured comprises:
- identifying measurement of a first phase current that is substantially constantly sourced to a respective first one of the plurality of phases of the disk-drive spindle motor in a commutation cycle based on a respective first one of the plurality of switching signals associated with the first phase current having a greatest PWM duty-cycle in each PWM period of the commutation cycle; and
- identifying a magnitude of a second phase current flowing that is substantially constantly sunk from a respective second one of the plurality of phases of the disk-drive spindle motor to a low voltage power rail in the commutation cycle based on a respective second one of the plurality of switching signals associated with the second phase current having no PWM duty-cycle;
- wherein measuring the magnitude of the respective individual phase current comprises measuring the magnitude of the first phase current and the second phase current.

10. The method of claim 9, further comprising converting the magnitude of the first phase current and the second phase current to respective digital values, and wherein calculating the magnitude of one or more remaining phase currents comprises calculating a magnitude of a third phase current based on the digital values.

11. The method of claim 9, further comprising:
- implementing a calibration routine to calculate at least one of offset and gain information associated with each of the plurality of phases of the disk-drive spindle motor; and
- storing the at least one of the offset and gain information to compensate for at least one of process and temperature variations in measuring the magnitude of the first phase current.

12. The method of claim 11, wherein implementing the calibration routine comprises:
- measuring a sourcing current through each of the plurality of phases of the disk-drive spindle motor;
- generating digital values associated with the measured sourcing current through each of the plurality of phases of the disk-drive spindle motor; and
- calculating the at least one of the offset and gain information based on the digital values.

13. The method of claim 8, further comprising:
- generating a first reference current one of to and from a phase node associated with the at least one of the plurality of phases of the disk-drive spindle motor via a first sense transistor; and
- generating a second reference current one of to and from a power rail via a second sense transistor;
- wherein switching a plurality of reference currents comprises switching the first and second reference currents to an operational amplifier configured to generate the sense voltage in response to the first reference current, the second reference current, and a third reference current that flows one of to and from the phase node associated with the at least one of the plurality of phases of the disk-drive spindle motor.

14. The method of claim 8, wherein switching the plurality of reference currents corresponding to the respective individual phase current to the respective current sense system comprises:
- switching a first plurality of reference currents corresponding to a first phase current flowing from a high-voltage power rail through a respective first one of the plurality of phases of the disk-drive spindle motor to a high-side current sense system; and switching a second plurality of reference currents corresponding to a second phase current flowing through a respective second one of the plurality of phases of the disk-drive spindle motor to a low-side current sense system.

15. A disk-drive spindle motor power regulator system comprising:
    means for generating a plurality of switching signals associated with each of a first phase, a second phase, and a third phase, respectively, of the disk-drive spindle motor;
    means for generating a first phase current, a second phase current, and a third phase current through the first, second, and third phases respectively, of the disk-drive spindle motor in response to the plurality of switching signals;
    means for measuring a magnitude of two of the first, second, and third phase currents, wherein the means for measuring includes:
        means for generating a first sense voltage corresponding to a magnitude of a first one of the first, second, and third phase currents;
        means for generating a second sense voltage corresponding to a magnitude of a second one of the first, second, and third phase currents;
        means for switching a first one of the first, second, and third phase currents to the means for generating the first sense voltage; and
        means for switching a second one of the first, second, and third phase currents to the means for generating the second sense voltage in response to the plurality of switching signals; and
    means for calculating a magnitude of a remaining one of the first, second, and third phase currents based on the measured magnitude of the two of the first, second, and third phase currents.

16. The system of 15, wherein the means for generating the plurality of switching signals comprises means for identifying the first one of the first, second, and third phase currents that is substantially constantly sourced to a respective first one of the first, second, and third phases of the disk-drive spindle motor in a commutation cycle to be measured and for measuring the second one of the first, second, and third phase currents that is substantially constantly sunk from a respective second one of the plurality of phases of the disk-drive spindle motor to a low voltage power rail in the commutation cycle to be measured.

17. The system of claim 15, further comprising means for converting the first and second sense voltages to digital values, the means for calculating being configured to calculate the remaining one of the first, second, and third phase currents based on the digital values.

18. An apparatus comprising:
    a first supply rail;
    a second supply rail;
    an inverter having that has a plurality of output terminals and that is coupled between the first and second supply rails, wherein each output terminal is coupled to a high-side transistor and a low-side transistor;
    a controller that is coupled to the inverter so as to control the inverter;
    a current-sense circuit having:
        a plurality of sensing circuits, wherein each sensing circuit has:
            a first transistor that is coupled to at least one of the output terminals of the inverter and the controller, wherein the controller is configured to control the first transistor; and
            a second transistor that is coupled to at least one of the first and second supply rails and the controller, wherein the controller is configure to control the second transistor; and
        an amplifier that is coupled to the switching circuit for each sensing circuit; and
    a feedback circuit that is coupled between the amplifier and the controller.

19. The apparatus of claim 18, wherein the feedback circuit further comprises an ADC that is coupled to the amplifier.

20. The apparatus of claim 19, wherein the each of the sensing circuits further comprises a switching circuit that is coupled between the first and second transistors and the amplifier.

21. The apparatus of claim 20, wherein the current-sense circuit further comprises a first current-sense circuit that is associated with the high-side transistor for each output terminal and a second current-sense circuit that is associated with the low-side transistor for each output terminal.

22. The apparatus of claim 20, wherein the amplifier further comprises:
    a current control circuit that is coupled to the switching circuit; and
    a bias current circuit that is coupled between the current control circuit.

23. The apparatus of claim 22, wherein the current control circuit further comprises:
    a first current mirror that is coupled to the switching circuit, wherein the first current mirror is a cascoded current mirror;
    a second current mirror that is coupled to the first current mirror; and
    a level-shifter that is coupled to the first current mirror; and
    a clamp that is coupled to the level-shifter.

24. The apparatus of claim 23, wherein the bias current circuit further comprises:
    a current source;
    a third current mirror that is coupled to the second current mirror; and
    a fourth current mirror that is coupled to the third current mirror.

25. The apparatus of claim 24, wherein the current-sense circuit further comprises a first current-sense circuit that is associated with the high-side transistor for each output terminal and a second current-sense circuit that is associated with the low-side transistor for each output terminal.

* * * * *